(12) United States Patent
Ueda et al.

(10) Patent No.: US 11,326,918 B2
(45) Date of Patent: May 10, 2022

(54) FLOWMETER

(71) Applicant: DENSO CORPORATION, Nisshin (JP)

(72) Inventors: Kazuaki Ueda, Nisshin (JP); Yuusuke Yoshida, Nisshin (JP); Kengo Ito, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/173,642

(22) Filed: Feb. 11, 2021

(65) Prior Publication Data

US 2021/0164819 A1 Jun. 3, 2021

Related U.S. Application Data

(63) Continuation of application No. PCT/JP2019/022359, filed on Jun. 5, 2019.

(30) Foreign Application Priority Data

Aug. 14, 2018 (JP) .............................. JP2018-152603

(51) Int. Cl.
*G01F 1/684* (2006.01)
*F02D 41/18* (2006.01)
*F02M 35/10* (2006.01)

(52) U.S. Cl.
CPC ........... *G01F 1/6842* (2013.01); *F02D 41/18* (2013.01); *F02M 35/10386* (2013.01); *G01F 1/684* (2013.01); *G01F 1/6847* (2013.01)

(58) Field of Classification Search
CPC ...... G01F 1/6842; G01F 1/6847; G01F 1/684; F02D 41/18; F02M 35/10386
See application file for complete search history.

(56) References Cited

U.S. PATENT DOCUMENTS

| | | | |
|---|---|---|---|
| 7,124,626 B2* | 10/2006 | Lenzing | G01F 1/6842 73/114.32 |
| 7,260,986 B2* | 8/2007 | Lenzing | G01F 1/6842 73/202.5 |
| 2003/0094041 A1* | 5/2003 | Iwaki | G01F 1/6842 73/204.21 |
| 2003/0159501 A1 | 8/2003 | Renninger et al. | |

(Continued)

FOREIGN PATENT DOCUMENTS

DE 112019004678 T5 * 6/2021 ............ G01F 15/14
JP H06-307906 11/1994

(Continued)

*Primary Examiner* — Ryan D Walsh
(74) *Attorney, Agent, or Firm* — Nixon & Vanderhye P.C.

(57) ABSTRACT

A flowmeter is disposed in a passage through which a fluid flows. The flowmeter includes a first passage and a second passage. The first passage defines an opening through which a part of the fluid flows into the flowmeter from the passage. The second passage branches off from the first passage and includes a flow rate detector configured to detect a flow rate of the fluid flowing through the second passage from the first passage. The second passage has one end at which the second passage branches off from the first passage and the other end. The second passage includes at least one end opening at the other end and an inflow reducer configured to restrict the fluid from flowing into the second passage through the at least one end opening.

11 Claims, 39 Drawing Sheets

(56) References Cited

U.S. PATENT DOCUMENTS

| | | | |
|---|---|---|---|
| 2007/0068246 A1* | 3/2007 | Uramachi | G01F 1/6842 73/202.5 |
| 2013/0008243 A1* | 1/2013 | Tagawa | G01F 15/12 73/114.32 |
| 2013/0019675 A1* | 1/2013 | Ban | G01F 1/6842 73/202 |
| 2016/0313165 A1* | 10/2016 | Sudou | G01F 5/00 |
| 2017/0356775 A1* | 12/2017 | Ito | F02M 35/10386 |
| 2018/0113015 A1* | 4/2018 | Akagi | G01F 1/6845 |
| 2019/0120674 A1 | 4/2019 | Morino et al. | |
| 2021/0172780 A1* | 6/2021 | Ueda | G01F 1/72 |

FOREIGN PATENT DOCUMENTS

| | | | | |
|---|---|---|---|---|
| JP | H11-014420 | | 1/1999 | |
| JP | 2000213974 A | * | 8/2000 | |
| JP | 2006-047272 | | 2/2006 | |
| JP | 2012-057975 | | 3/2012 | |
| JP | 5646030 B1 | * | 12/2014 | G01F 9/00 |
| JP | 2017-083317 | | 5/2017 | |
| WO | WO-2013187229 A1 | * | 12/2013 | G01F 1/6845 |
| WO | WO-2016027551 A | * | 2/2016 | G01F 1/684 |
| WO | WO-2018193764 A1 | * | 10/2018 | G01N 27/04 |
| WO | WO-2020066424 A1 | * | 4/2020 | G01F 1/684 |

* cited by examiner

US 11,326,918 B2

FLOWMETER

CROSS REFERENCE TO RELATED APPLICATION

The present application is a continuation application of International Patent Application No. PCT/JP2019/022359 filed on Jun. 5, 2019, which designated the U.S. and claims the benefit of priority from Japanese Patent Application No. 2018-152603 filed on Aug. 14, 2018. The entire disclosures of all of the above applications are incorporated herein by reference.

TECHNICAL FIELD

The present disclosure relates to a flowmeter.

BACKGROUND ART

A flowmeter is disposed in a main passage and includes a flow rate detector configured to detect a flow rate of a fluid flowing through the flowmeter from the main passage. Some flowmeters that cannot distinguish a flow direction of the fluid in detecting the flow rate include a member configured to reduce a dynamic pressure, which is generated when the fluid flows in a backward direction, around an outlet of a detecting passage.

SUMMARY

A flowmeter is disposed in a passage through which a fluid flows. The flowmeter includes a first passage and a second passage. The first passage defines an opening through which a part of the fluid flows into the first passage. The second passage branches off from the first passage and includes a flow rate detector configured to detect a flow rate of the fluid flowing through the second passage from the first passage. The second passage has one end at which the second passage branches off from the first passage and the other end opposite to the one end. The second passage includes at least one end opening at the other end of the second passage and an inflow reducer configured to restrict the fluid from flowing into the second passage through the at least one end opening.

DESCRIPTION OF EMBODIMENTS

To begin with, examples of relevant techniques will be described.
A flowmeter is disposed in a main passage and includes a flow rate detector configured to detect a flow rate of a fluid flowing through the flowmeter from the main passage. Some flowmeters that cannot distinguish a flow direction of the fluid in detecting the flow rate include a member configured to reduce a dynamic pressure, which is generated when the fluid flows in a backward direction, around an outlet of a detecting passage. As a result, the fluid is restricted from flowing into the flowmeter in the backward direction and a measurement error of the flow rate detector can be reduced.

However, in such flowmeter, even if the dynamic pressure generated around the outlet of the detecting passage when the fluid flows in the backward direction is reduced, in case that the backward flow of the fluid occurs in the main passage, a pressure on an inlet side of the detecting passage becomes negative compared to a pressure on the outlet side of the detecting passage. Thus, the fluid may flow into the flowmeter in the backward direction through the outlet of the detecting passage. Thus, it is needed to provide a technique to restrict the fluid from flowing into the detecting passage of the flowmeter through the outlet portion due to the backward flow.

According to an aspect of the present disclosure, a flowmeter is provided. The flowmeter is disposed in a passage through which a fluid flows. The flowmeter includes a first passage and a second passage. The first passage defines an opening through which a part of the fluid flows into the first passage. The second passage branches off from the first passage and includes a flow rate detector configured to detect a flow rate of the fluid flowing through the second passage from the first passage. The second passage has one end at which the second passage branches off from the first passage and the other end opposite to the one end. The second passage includes at least one end opening at the other end of the second passage and an inflow reducer configured to restrict the fluid from flowing into the second passage through the at least one end opening. According to this flowmeter, a vortex is likely to generate in the at least one end opening, so that the fluid is restricted from flowing into the flowmeter due to the backward flow. Thus, the measurement error of the flowmeter can be reduced by restricting the fluid from flowing into the flowmeter due to the backward flow.

A. First Embodiment

Figure 1:
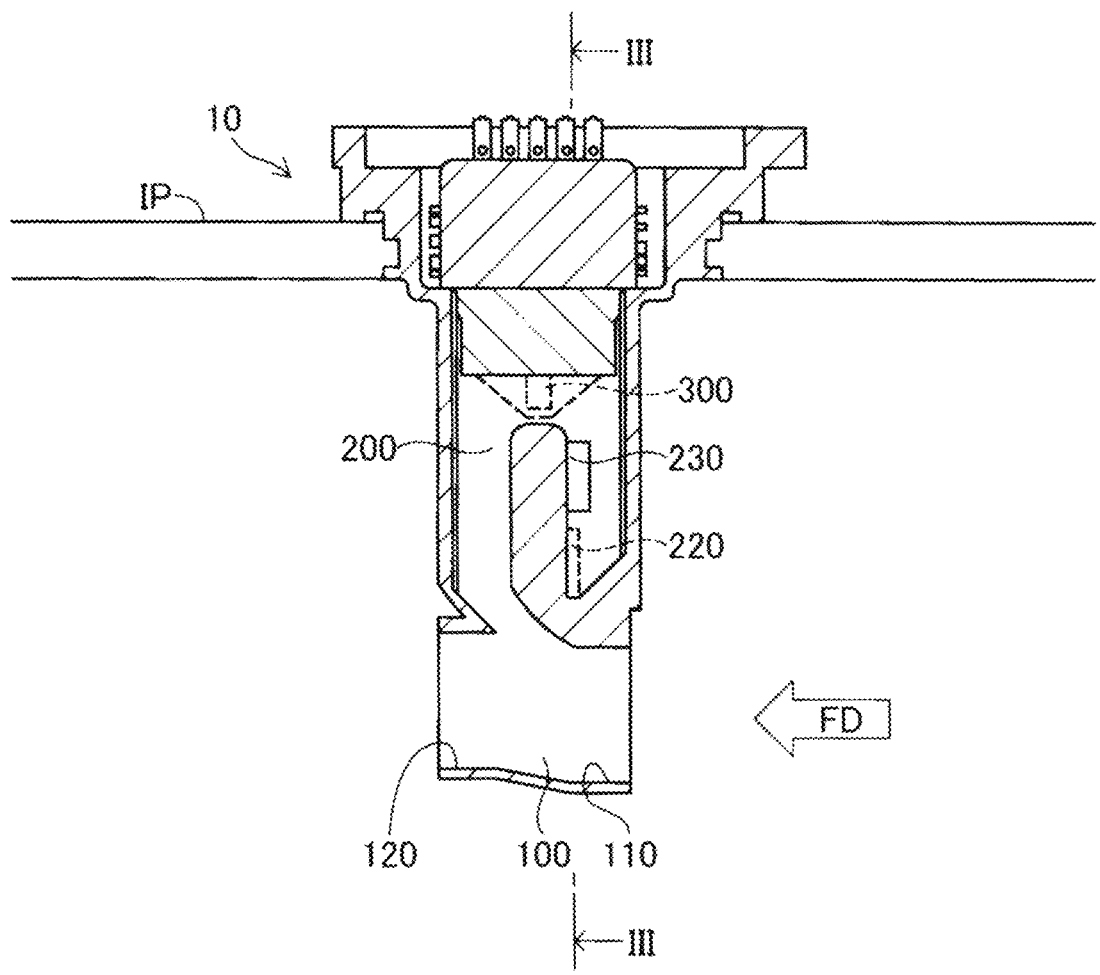
FIG. 1 is a cross-sectional view of a flowmeter of a first embodiment.

A flowmeter 10 of a first embodiment as shown in FIG. 1 is disposed in a passage through which a fluid flows and configured to measure a flow rate of the fluid flowing through the passage. In this embodiment, the flowmeter 10 is inserted into an intake pipe IP that guides a gas to flow into a cylinder of an internal combustion engine. A X axis, a Y axis, and a Z axis in FIG. 1 are three spatial axes that are perpendicular to each other. The XYZ axes in FIG. 1 correspond to XYZ axes in other figures. FIG. 1 is a cross-sectional view of the flowmeter 10 taken along a YZ plane. Regarding a flow direction of the fluid in FIG. 1, +Y direction is a forward direction and −Y direction is a backward direction. In FIG. 1, the direction in which the fluid flows forward is shown as a direction FD. In FIG. 1, the cylinder of the internal combustion engine is disposed on a +Y side of the flowmeter 10. The flowmeter 10 includes a first passage 100, a second passage 200, and a flow rate detector 300.

The first passage 100 is a passage into which a part of the fluid flowing through the intake pipe IP flows. The first passage 100 defines a first opening 110 on a −Y side of the first passage 100 and a second opening 120 on a +Y side of the first passage 100. The first passage 100 extends from the first opening 110 to the second opening 120.

The second passage 200 branches off from the first passage 100. The second passage 200 branches off from the first passage 100 and extends to an end opening 220.

Figure 2:
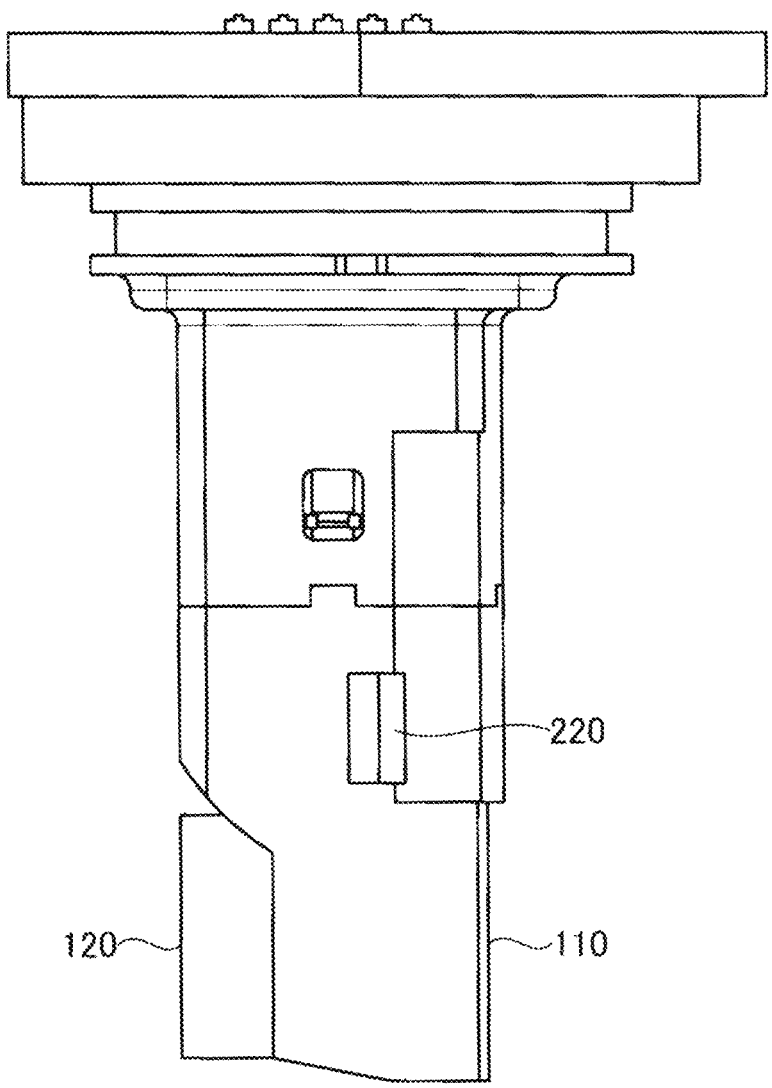
FIG. 2 is a side view of the flowmeter viewed in a −X direction.

FIG. 2 is a side view of the flowmeter 10 viewed in a −X direction. The end opening 220 opens from the second passage 200 in the −X direction.

With reference to FIG. 1 again, the flow rate detector 300 is disposed on +Z side of the second passage 200. The flow rate detector 300 is configured to detect a flow rate of the fluid flowing through the second passage 200 from the first passage 100. In the cross-sectional view shown in FIG. 1, the flow rate detector 300 and its peripheral configurations are disposed on a far side (i.e., a +X side) of a surface of paper in FIG. 1, thus they are shown in dashed lines. In this embodiment, a type of the flow rate detector 300 is a hot wire type. The flow rate detector 300 may be a flap type or Karman vortex type flow rate detector.

Figure 3:
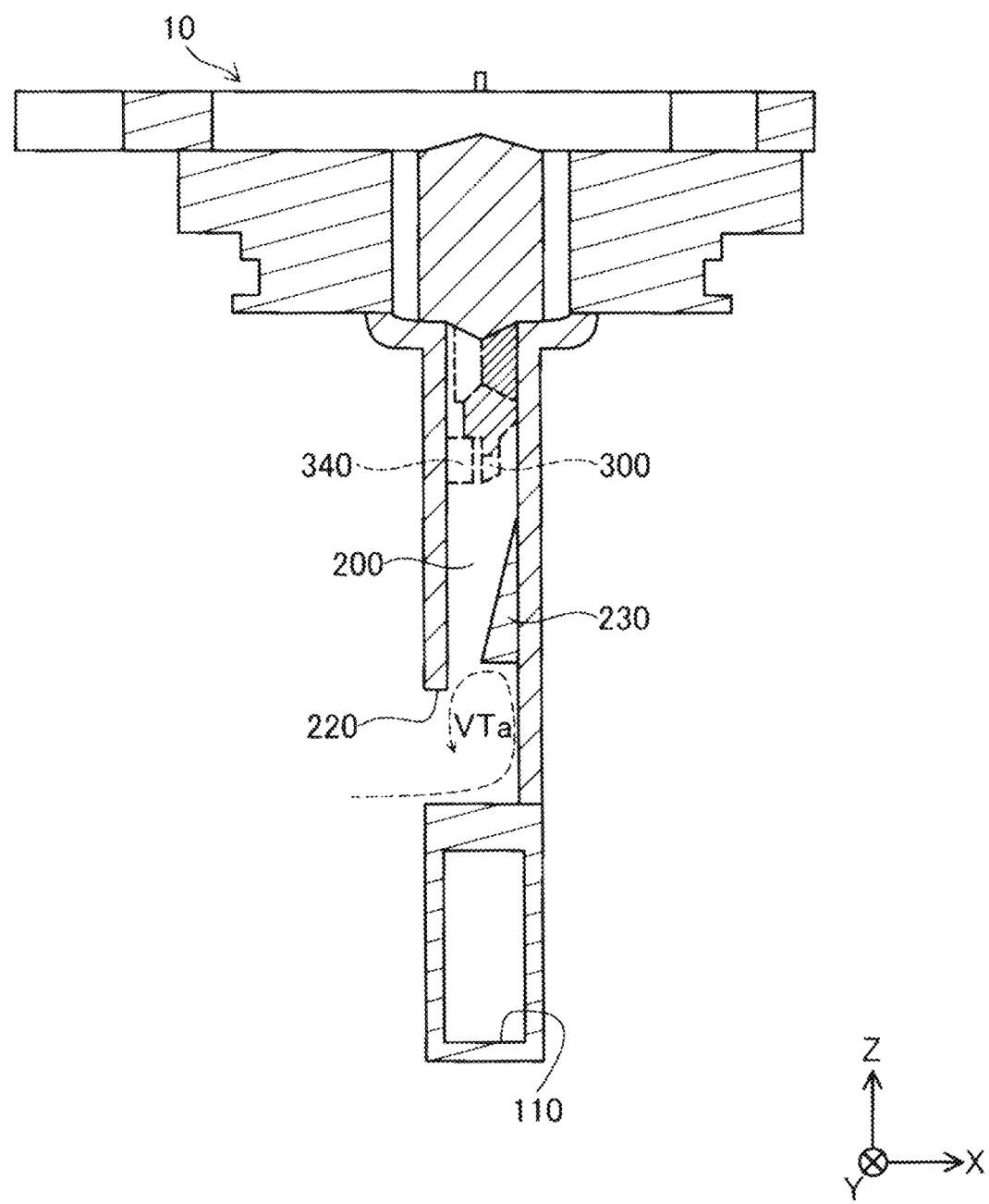
FIG. 3 is a cross-sectional view of the flowmeter of the first embodiment.

FIG. 3 is a cross-sectional view of the flowmeter 10 taken along a XZ plane passing through the end opening 220. FIG. 3 is the cross-sectional view of the flowmeter 10 viewed in a direction of arrows III. The flowmeter 10 includes a throttle portion 340 facing the flow rate detector 300 in the X direction. The throttle portion 340 restricts a flow of the fluid passing through the flow rate detector 300. In the cross-section shown in FIG. 3, the flow rate detector 300 and the throttle portion 340 are located on a far side (i.e., +Y side) of a surface of paper in FIG. 3, thus the flow rate detector 300 and the throttle portion 340 are shown in dashed lines.

The flowmeter 10 includes a protrusion 230 protruding into the second passage 200 from a part of a wall surface of the second passage 200 between the flow rate detector 300 and the end opening 220. In this embodiment, the protrusion 230 protrudes in the −X direction from a portion of the wall surface located on +X side of the second passage 200. The portion of the wall surface located on the +X side of the second passage 200 is a facing surface that faces the end opening 220. The protrusion 230 protrudes in the −X direction from a portion of the wall surface located on the +X side and a +Y side of the second passage 200. A cross-sectional shape of the protrusion 230 taken along the XZ plane is triangular.

Figure 4:
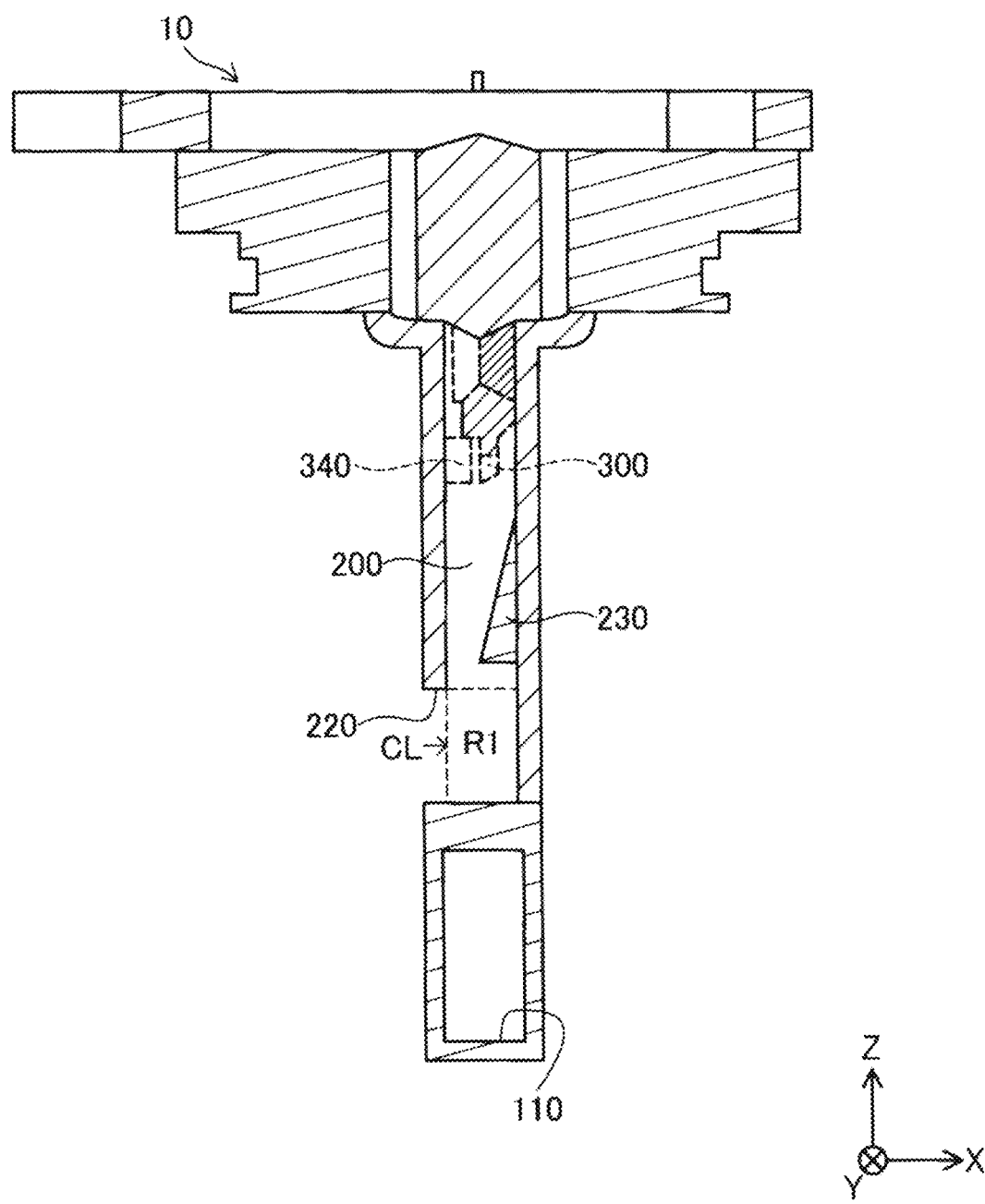
FIG. 4 is a cross-sectional view of the flowmeter of the first embodiment.

FIG. 4 illustrates a region R1 formed by projecting the end opening 220 in the X direction that is a direction along a center line (CL) of the end opening 220. The center line CL of the end opening 220 is a line passing through a center (i.e, a gravity center) of a cross-section of a part of the end opening 220 on a +X side of the end opening 220 and a center (i.e, a gravity center) of a cross-section of a part of the end opening 220 on a −X side of the end opening 220. In this embodiment, the protrusion 230 does not overlap with the region R1 of the wall surface defining the second passage 200. The protrusion 230 is formed into a shape such that a flow resistance of the fluid flowing from the flow rate detector 300 to the end opening 220 is less than a flow resistance of the fluid flowing from the end opening 220 to the flow rate detector 300.

The flowmeter 10 is configured to detect a flow rate of the fluid flowing through the intake pipe IP in the +Y direction (i.e., a forward direction). That is, the flow rate detector 300 detects a flow rate of a part of the fluid having flown into the first passage 100 through the first opening 110 and flowing to the end opening 220. Thus, if the fluid flows into the flowmeter 10 through the end opening 220 to the first passage 100, a measurement error of the flow rate detector 300 may occur. As shown in FIG. 1, the flowmeter 10 includes the protrusion 230. Thus, even if the fluid flows into the flowmeter 10 through the end opening 220, the fluid is reflected at the protrusion 230 and a vortex VTa is generated (see FIG. 3), which can restrict the fluid from flowing into the flowmeter 10 in the backward direction.

Figure 5:
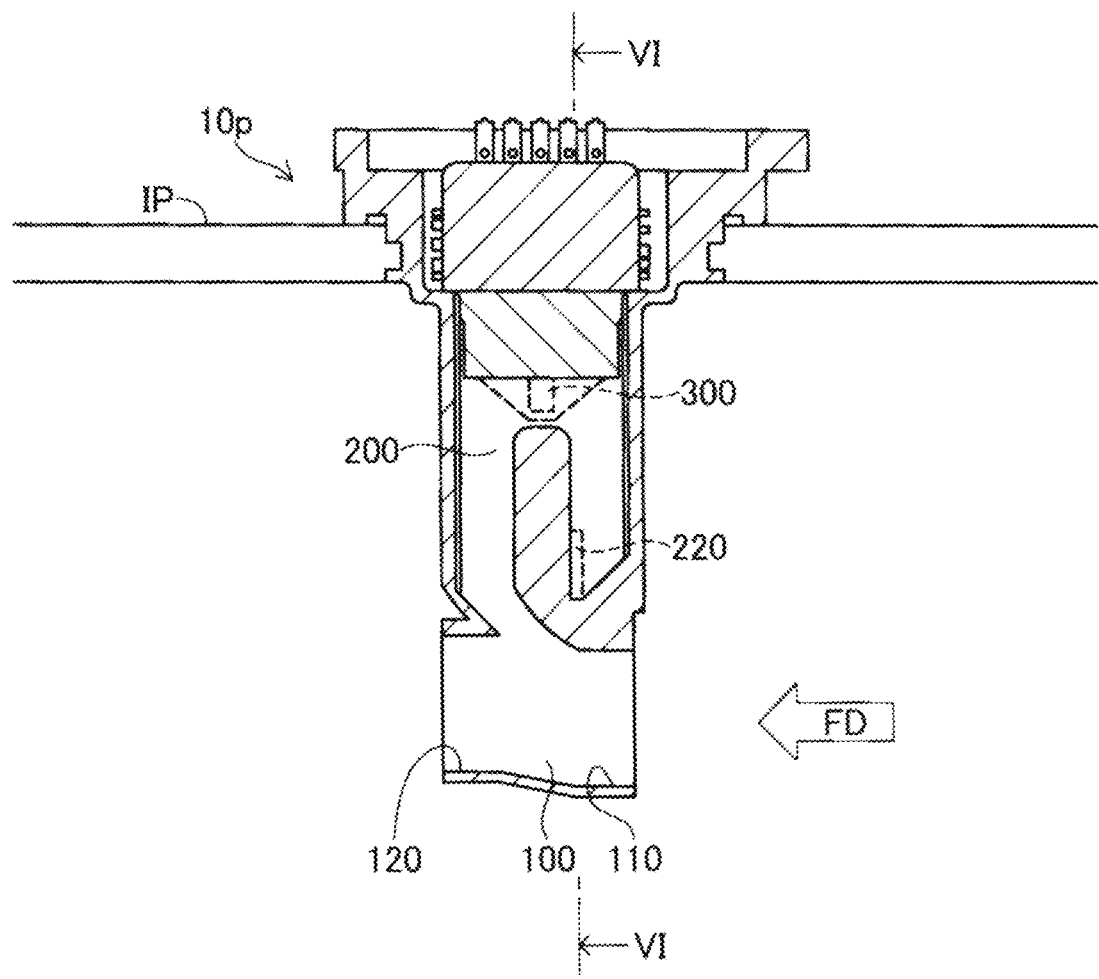
FIG. 5 is a cross-sectional view of a flowmeter of a comparative example.
Figure 6:
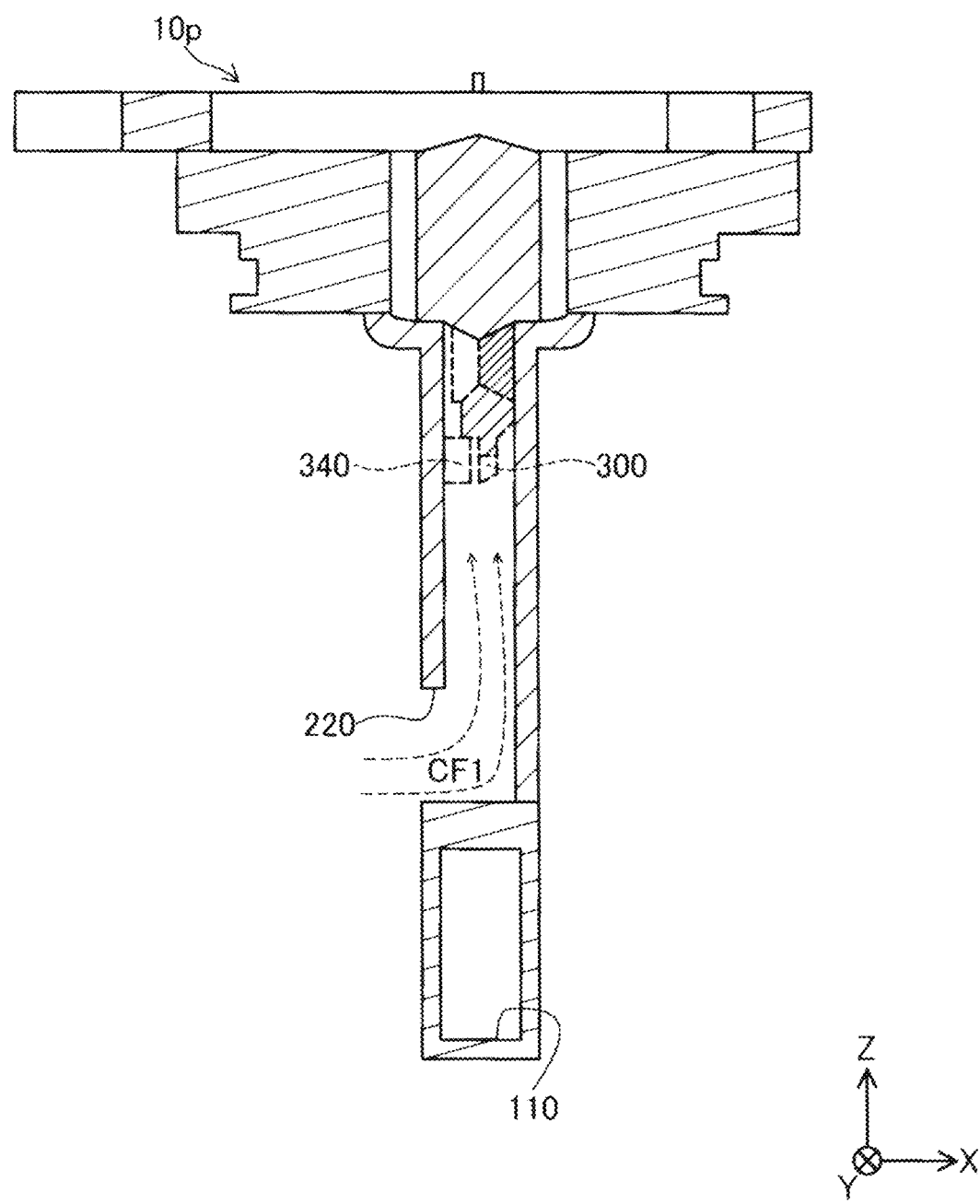
FIG. 6 is a cross-sectional view of the flowmeter of the comparative example.

A flowmeter 10p of a comparative example shown in FIG. 5 differs from the flowmeter 10 of the first embodiment in that the flowmeter 10p does not include the protrusion 230. Other portions are similar to those of the first embodiment. The same reference numerals as those in the first embodiment indicate the same configurations with the first embodiment, and references are made to the preceding description. FIG. 6 is a cross-sectional view of the flowmeter 10p taken along the XZ plane passing through the end opening 220.

The flowmeter 10p of the comparative example does not include the protrusion 230. Thus, as shown in a flow CF1 in FIG. 6, the fluid flowing into the flowmeter 10p through the end opening 220 flows toward the first passage 100. This leads to a measurement error of the flow rate detector 300. In contrast, the flowmeter 10 of the first embodiment includes the protrusion 230. Thus, even if the fluid flows into the flowmeter 10 through the end opening 220, the fluid is reflected at the protrusion 230 and a vortex VTa is generated, so that the fluid is restricted from flowing into the flowmeter 10 in the backward direction. Therefore, the measurement error of the flow rate detector 300 can be reduced by restricting the fluid from flowing into the flowmeter 10 in the backward direction.

In the flowmeter 10 of the first embodiment, the protrusion 230 protrudes in the −X direction from a portion of the wall surface of the second passage 200 located on the +X side of the second passage 200. Compared to a case in which the protrusion 230 is located in a portion of the wall surface of the second passage 200 that is different from the portion of the wall surface located on the +X side of the second passage 200, a passage axis of the second passage 200 can be greatly changed at the protrusion 230 and the protrusion 230 can easily block a flow of the fluid flowing into the flowmeter 10 through the end opening 220. Therefore, the vortex VTa is likely to generate.

In the flowmeter 10 of the first embodiment, the protrusion 230 is disposed in a portion of the wall surface of the second passage 200 that does not overlap with the region R1. Therefore, compared to a case in which the protrusion 230 is located within the region R1, the protrusion 230 is likely to block the fluid flowing into the flowmeter 10 through the end opening 220. Thus, the vortex VTa is likely to generate.

The protrusion 230 is formed into a shape such that a flow resistance of the fluid flowing from the flow rate detector 300 to the end opening 220 is less than a flow resistance of the fluid flowing from the end opening 220 to the flow rate detector 300. Thus, the protrusion 230 blocks the fluid flowing into the flowmeter 10 through the end opening 220 and the vortex VTa is likely generated while the fluid flows smoothly into the first passage 100 toward the end opening 220.

B. Second Embodiment

Figure 7:
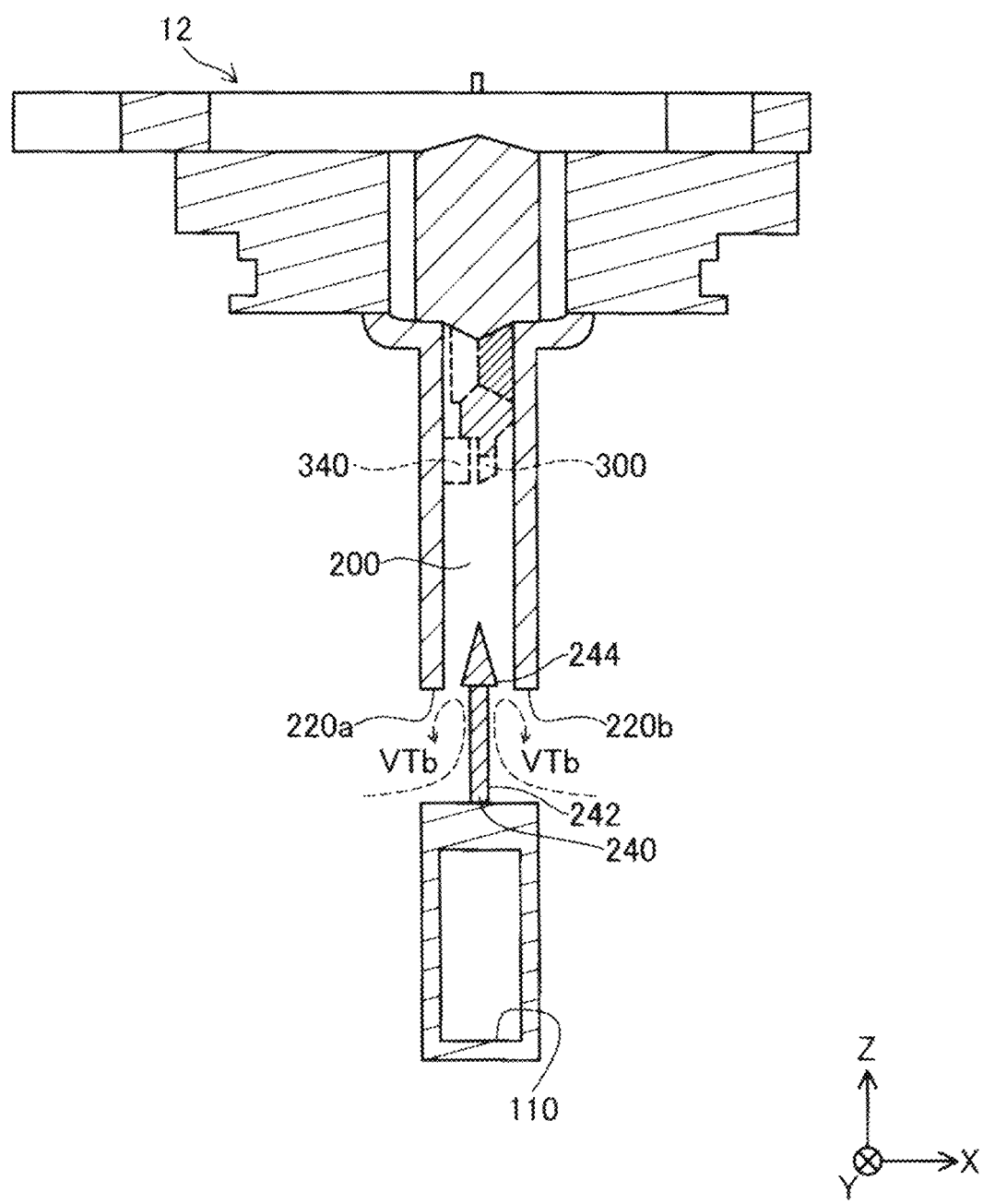
FIG. 7 is a cross-sectional view of a flowmeter of a second embodiment.

As shown in FIG. 7, a flowmeter 12 of a second embodiment differs from the flowmeter 10 of the first embodiment in that the flowmeter 12 does not include the protrusion 230, the flowmeter 12 includes an end opening 220a and an end opening 220b in place of the end opening 220, and the flowmeter 12 includes a partition 240. Other portions are similar to those of the first embodiment. The same reference numerals as those in the first embodiment indicate the same configurations with the first embodiment and a reference is made to the preceding descriptions.

The end opening 220a opens from the second passage 200 in the −X direction. The end opening 220b opens from the second passage 200 in the +X direction. The end opening 220a and the end opening 220b are rectangular openings that have the same size.

Figure 8:
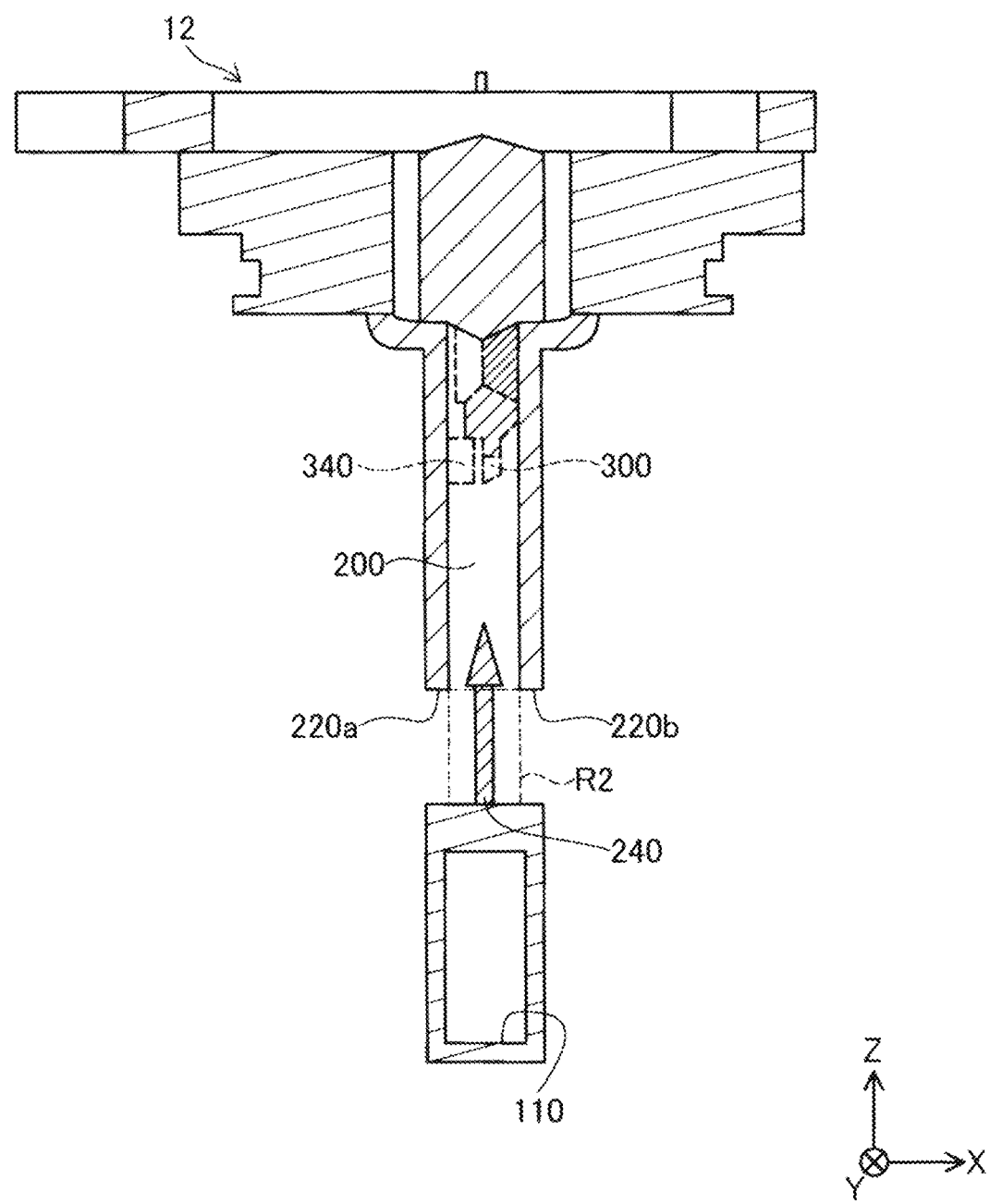
FIG. 8 is a cross-sectional view of the flowmeter of the second embodiment.

The partition 240 separates the end opening 220a from the end opening 220b. In other words, when the end opening 220a is viewed from a +X side of the end opening 220a, the end opening 220b is invisible behind the partition 240. When the end opening 220b is viewed from a −X side of the end opening 220b, the end opening 220a is also invisible behind the partition 240. The partition 240 includes a thin portion 242 and a thick portion 244. The thin portion 242 is a portion of the partition overlapping with the end opening 220a and the end opening 220b. The thick portion 244 is a portion of the partition 240 between the flow rate detector 300 and the thin portion 242. The thin portion 242 is thinner than the thick portion 244. FIG. 8 is a view illustrating a portion facing the end opening 220a and the end opening 220b. The portion facing the end opening 220a and the end opening 220b is a portion of the partition 240 located within a region R2. The region R2 is formed by projecting the end opening 220a and the end opening 220b in the X direction that is a center line direction of the end opening 220a and the end opening 220b.

The flowmeter 12 includes the partition 240. Thus, even if the fluid flows into the flowmeter 12 through the end opening 220a and the end opening 220b, the fluid flowing along the thin portion 242 is reflected at the thick portion 244 of the partition 240 to generate a vortex VTb. As a result, the fluid is restricted from flowing into the flowmeter 10 in the backward direction.

Figure 9:
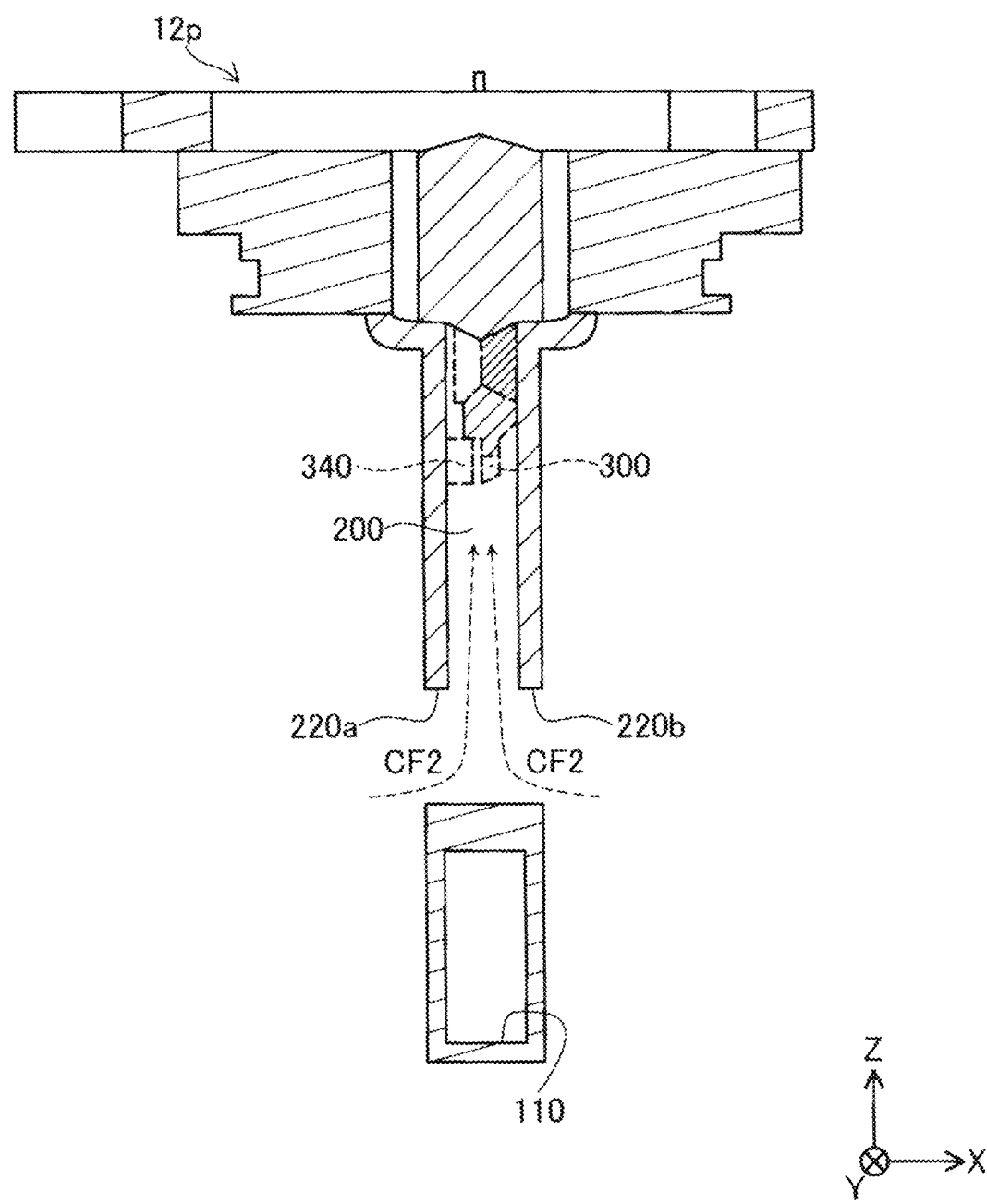
FIG. 9 is a cross-sectional view of a flowmeter of a comparative example.

As shown in FIG. 9, a flowmeter 12p of a comparative example differs from the flowmeter 12 of the second embodiment in that the flowmeter 12p does not include the partition 240. Other configurations are similar to those of the second embodiment. The same reference numerals as those in the second embodiment show the same configurations and references are made to the preceding descriptions.

Since the flowmeter 12p of the comparative example does not include the partition 240, the fluid flowing into the flowmeter 12p through the end opening 220a and the end opening 220b flows toward the flow rate detector 300 as shown in a flow CF2. Such generation of the flow CF2 leads to the measurement error of the flow rate detector 300. In contrast, the flowmeter 12 of the second embodiment includes the partition 240. Thus, even if the fluid flows into the flowmeter 12 through the end opening 220a and the end opening 220b, the fluid flowing along the thin portion 242 is reflected at the thick portion 244 of the partition 240 to generate the vortex VTb. As a result, the fluid is restricted from flowing into the flowmeter 12 in the backward direction. Therefore, the measurement error of the flow rate detector 300 can be reduced by restricting the fluid from flowing into the flowmeter 12 in the backward direction.

C. Third Embodiment

Figure 10:
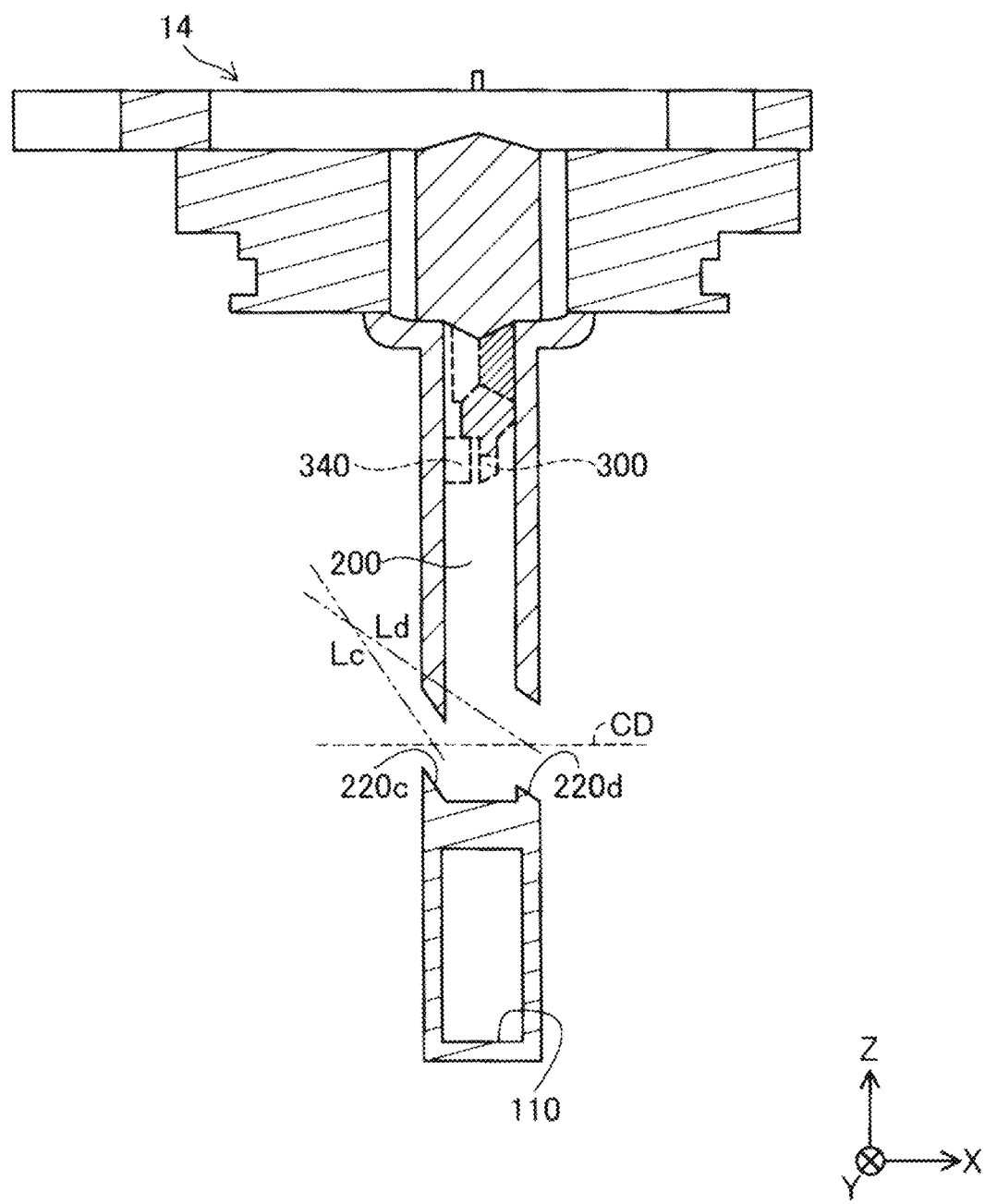
FIG. 10 is a cross-sectional view of a flowmeter of a third embodiment.

As shown in FIG. 10, a flowmeter 14 of a third embodiment differs from the flowmeter 12 of the second embodiment in that the flowmeter 14 does not include the partition 240 and includes an end opening 220c and an end opening 220d in place of the end opening 220a and the end opening 220b. Other configurations are similar to those of the flowmeter 12 of the second embodiment. The same reference numerals as those in the second embodiment indicate the same configurations with the second embodiment and references are made to the preceding descriptions.

The end opening 220c opens from the second passage 200 in the −X direction. The end opening 220d opens from the second passage 200 in the +X direction. A direction in which the end opening 220c and the end opening 220d face each other is defined as the X direction. The end opening 220c and the end opening 220d have opening end surfaces. The opening end surface of the end opening 220c and the opening end surface of the end opening 220d are tilted toward the same side relative to a facing line CD that connects between two centers of the end opening 220c and the end opening 220d. That the opening end surfaces are tilted toward the same side relative to the facing line CD means that components of the slopes of the opening end surfaces relative to the facing line CD have the same correlation. For example, in the flowmeter 14 in FIG. 10, both a line segment Lc showing the slope of the opening end surface of the end opening 220c and a line segment Ld showing the slope of the opening end surface of the end opening 220d have negative correlation between a component in the X axis and a component in a Z axis. That is, the line segment Lc and the line segment Ld extend from the +Z side to the −Z side as extending from the −X side to +X side, which means both the line segment Lc and the line segment Ld have negative correlation between the X direction and the Y direction. It is only required that the line segments have the same correlation. Thus, the line segment Lc may have a slope that is different from a slope of the line segment Ld. That is, the line segment Lc and the line segment Ld are not necessarily parallel to each other. The slope of the opening end surface of the end opening 220c and the slope of the opening end surface of the end opening 220d are not limited to have negative correlations between the X direction and the Z direction. The slope of the opening end surface of the end opening 220c and the slope of the opening end surface of the end opening 220d may have positive correlations between the X direction and the Y direction.

Figure 11:
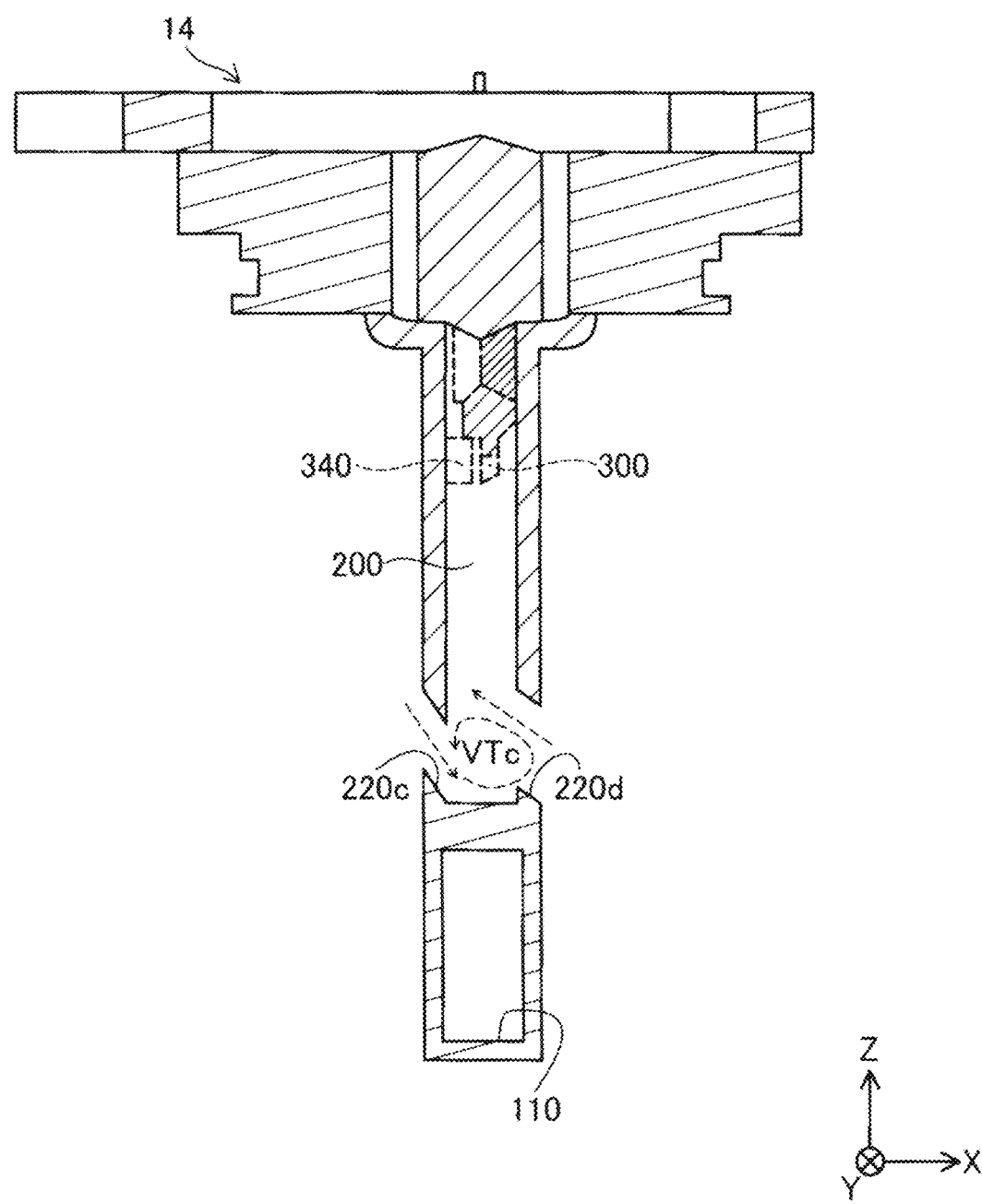
FIG. 11 is a cross-sectional view of the flowmeter of the third embodiment.

FIG. 11 illustrates a state of the flowmeter 14 when the fluid flows into the flowmeter 14 through the end opening 220c and the end opening 220d. When the fluid flows into the flowmeter 14 through the end opening 220c and the end opening 220d, the fluid flowing into the flowmeter 14 through the end opening 220c and the fluid flowing into the flowmeter 14 through the end opening 220d face each other to generate a shear stress. The shear stress is likely to generate a vortex VTc. The vortex VTc restricts the fluid from flowing into the flowmeter 14 through the end opening 220c and the end opening 220d, so that the measurement error of the flow rate detector 300 can be reduced.

D. Fourth Embodiment

Figure 12:
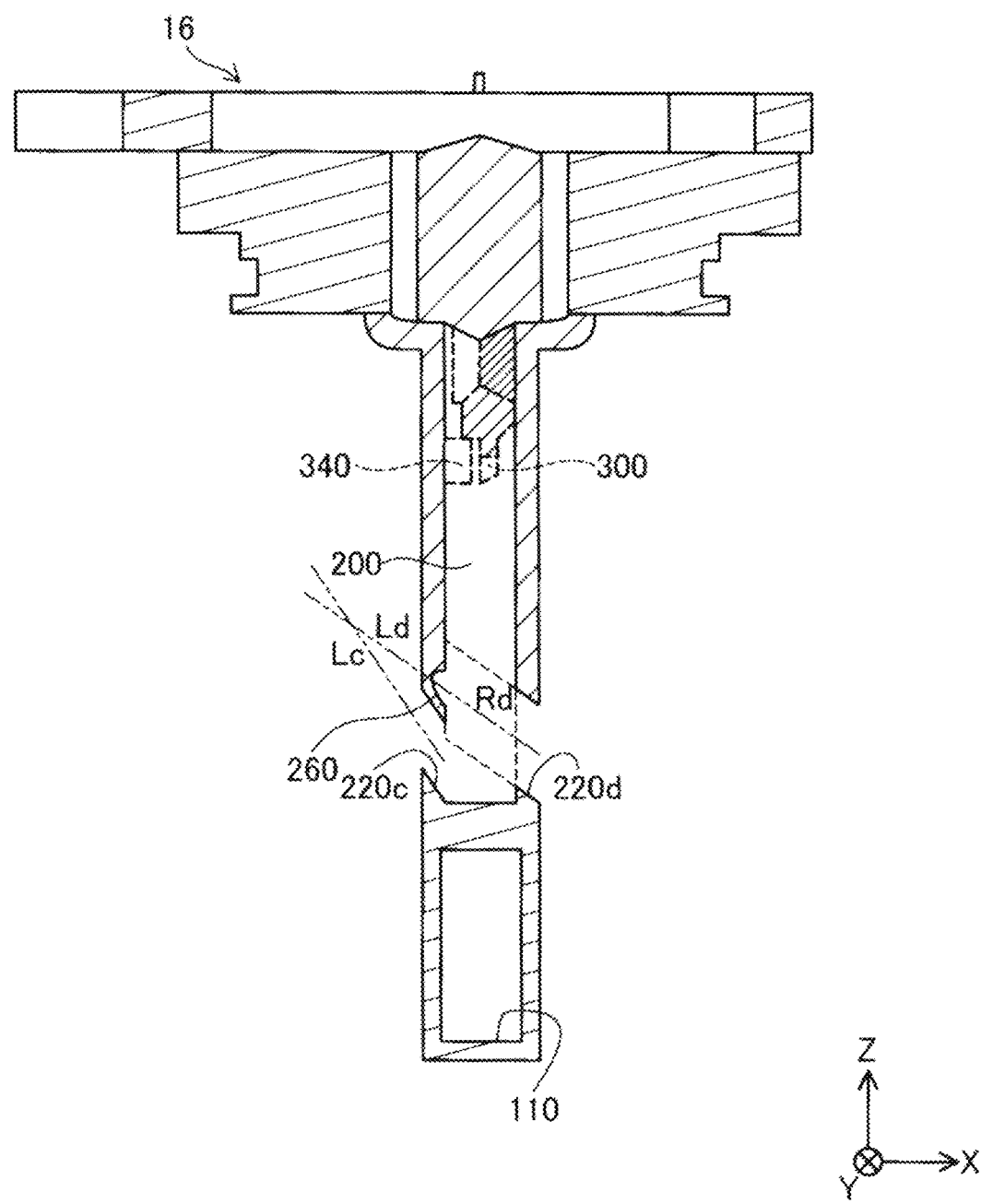
FIG. 12 is a cross-sectional view of a flowmeter of a fourth embodiment.

As shown in FIG. 12, a flowmeter 16 of a fourth embodiment differs from the flowmeter 14 of the third embodiment in that the flowmeter 16 includes a recess 260. Other configurations are similar to those of the third embodiment. The same reference numerals with those in the third embodiment show the same configurations in the third embodiment and references are made to the preceding descriptions.

The recess 260 is entirely disposed within a range Rd of the wall surface of the second passage 200. The range Rd is formed by projecting the end opening 220d onto the wall surface of the second passage 200 along the line segment Ld.

Figure 13:
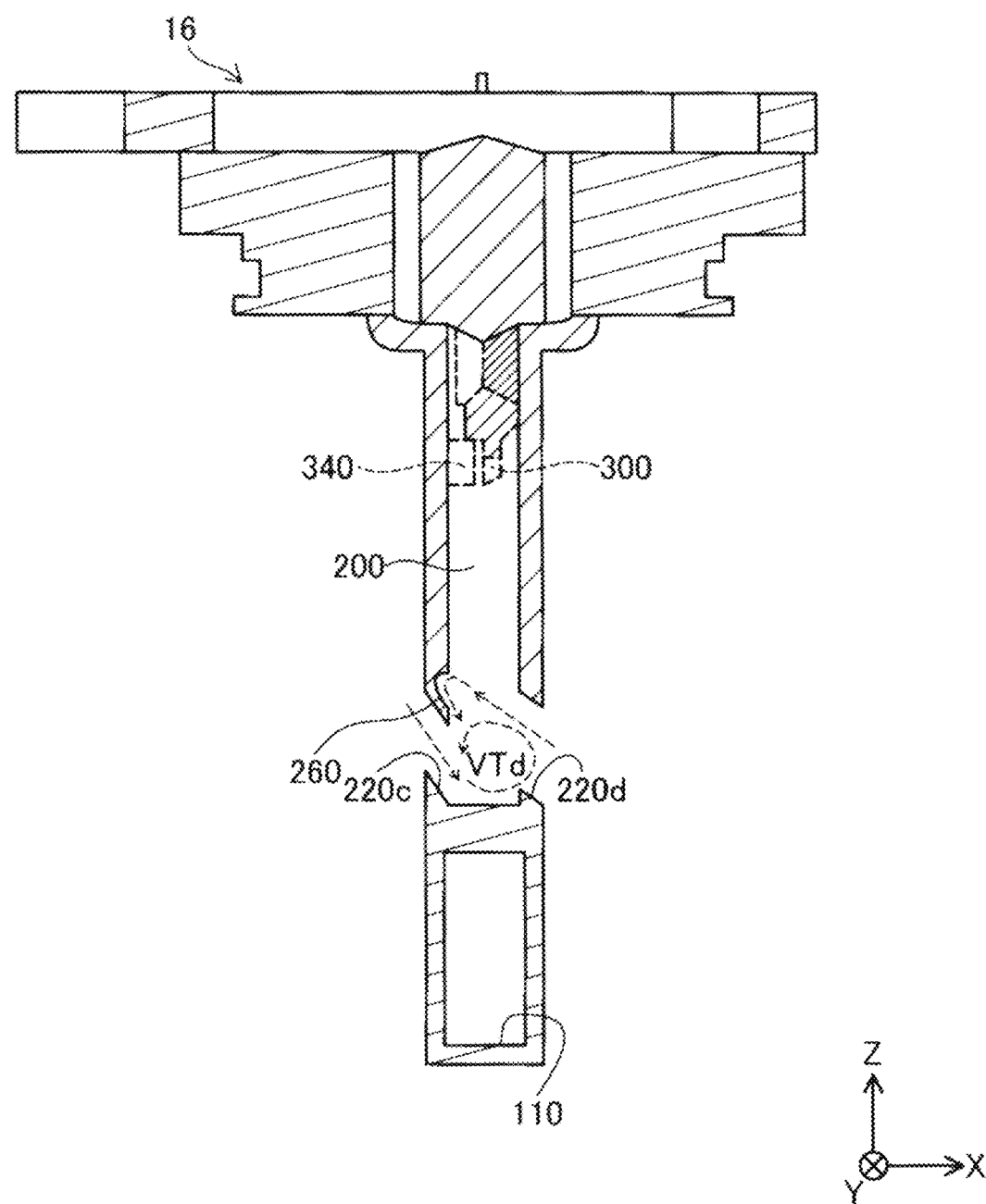
FIG. 13 is a cross-sectional view of the flowmeter of the fourth embodiment.

FIG. 13 illustrates a state of the flowmeter 16 where the fluid flows into the flowmeter 16 through the end opening 220c and the end opening 220d. When the fluid flows into the flowmeter 16 through the end opening 220c and the end opening 220d, the fluid flowing into the flowmeter 16 through the end opening 220c and the fluid flowing into the flowmeter 16 through the end opening 220d face each other to generate a shear stress. The shear stress is likely to generate a vortex VTd. Additionally, a flow of the fluid flowing into the flowmeter 16 through the end opening 220d is reversed along the recess 260, which assists to generate the vortex VTd.

E. Fifth Embodiment

Figure 14:
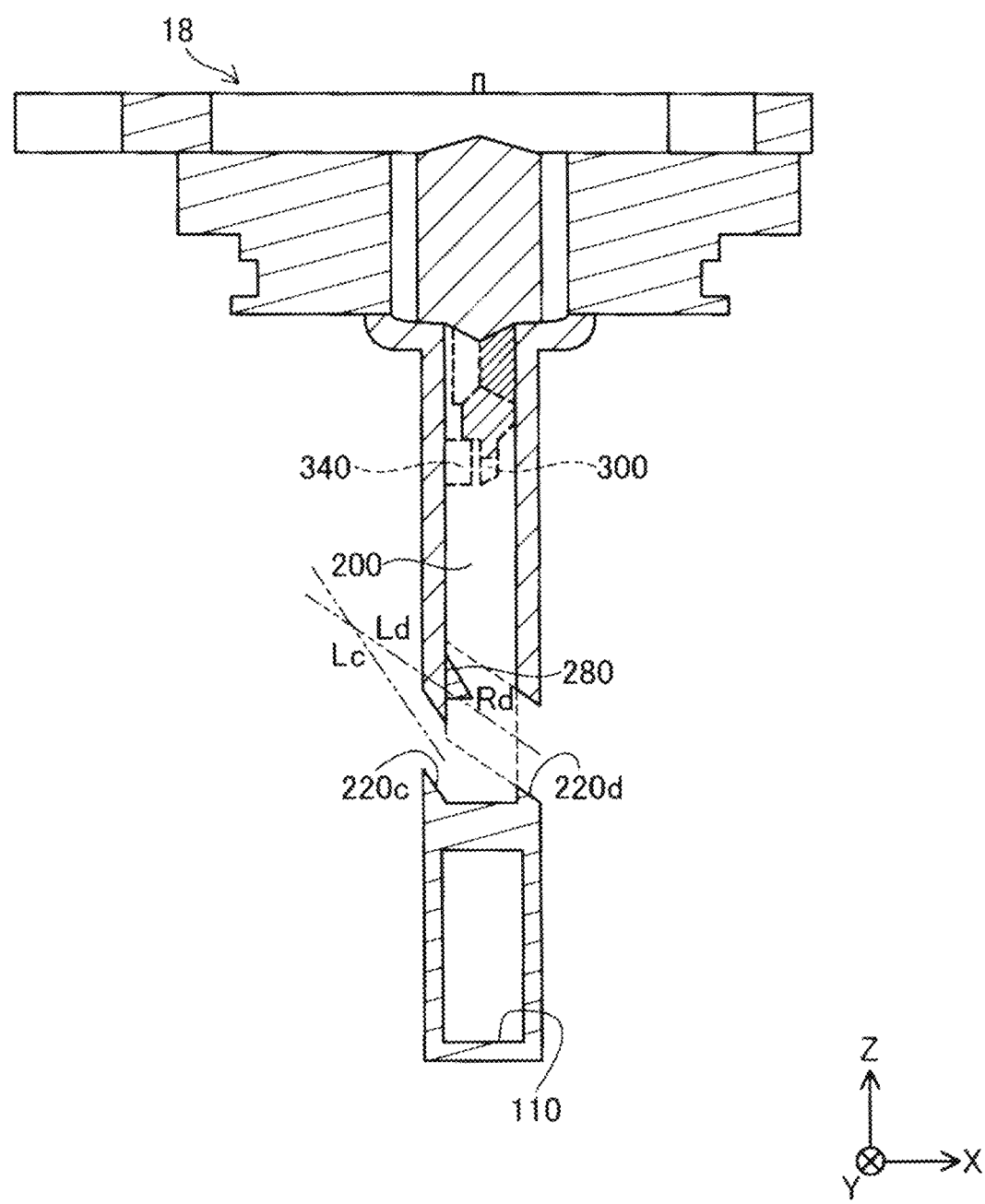
FIG. 14 is a cross-sectional view of a flowmeter of a fifth embodiment.

As shown in FIG. 14, a flowmeter 18 of a fifth embodiment differs from the flowmeter 16 of the fourth embodiment in that the flowmeter 18 includes a protrusion 280 in place of the recess 260. Other configurations are similar to those of the fourth embodiment. The same reference numerals as those in the fourth embodiment show the same configurations with the fourth embodiment and references are made to the preceding descriptions.

The protrusion 280 protrudes from a portion of the wall surface of the second passage 200 into the second passage 200. The portion of the wall surface is entirely disposed within the region Rd.

Figure 15:
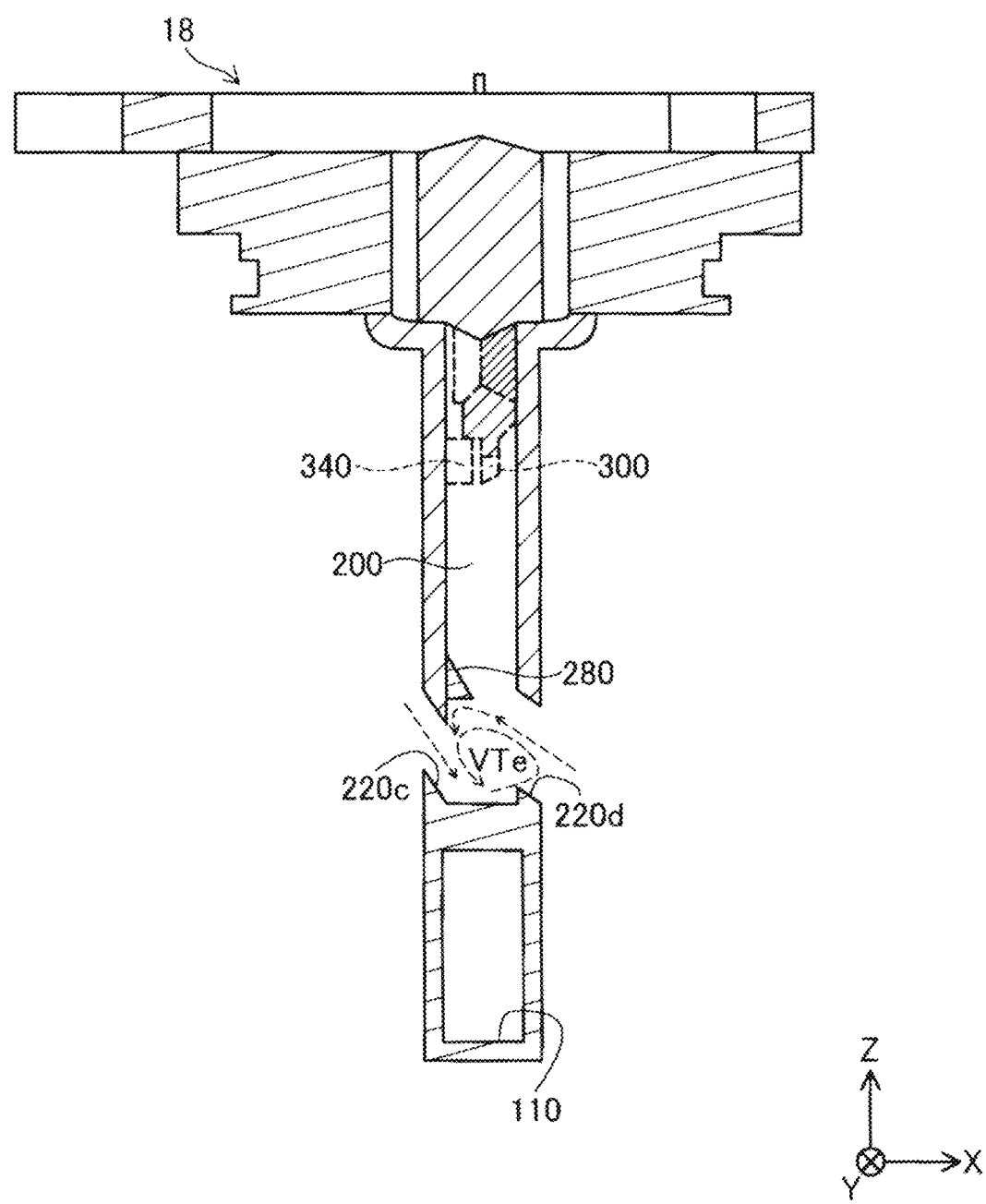
FIG. 15 is a cross-sectional view of the flowmeter of the fifth embodiment.

FIG. 15 illustrates a state of the flowmeter 18 where the fluid flows into the flowmeter 18 through the end opening 220c and the end opening 220d. When the fluid flows into the flowmeter 18 through the end opening 220c and the end opening 220d, the fluid flowing into the flowmeter 18 through the end opening 220c and the fluid flowing into the flowmeter 18 through the end opening 220d face each other to generate a shear stress. The shear stress is likely to generate a vortex VTe. A flow of the fluid flowing into the flowmeter 18 through the end opening 220d is reversed by reflecting at the protrusion 280, which assists to generate the vortex VTe.

F. Other Embodiments

Figure 16:
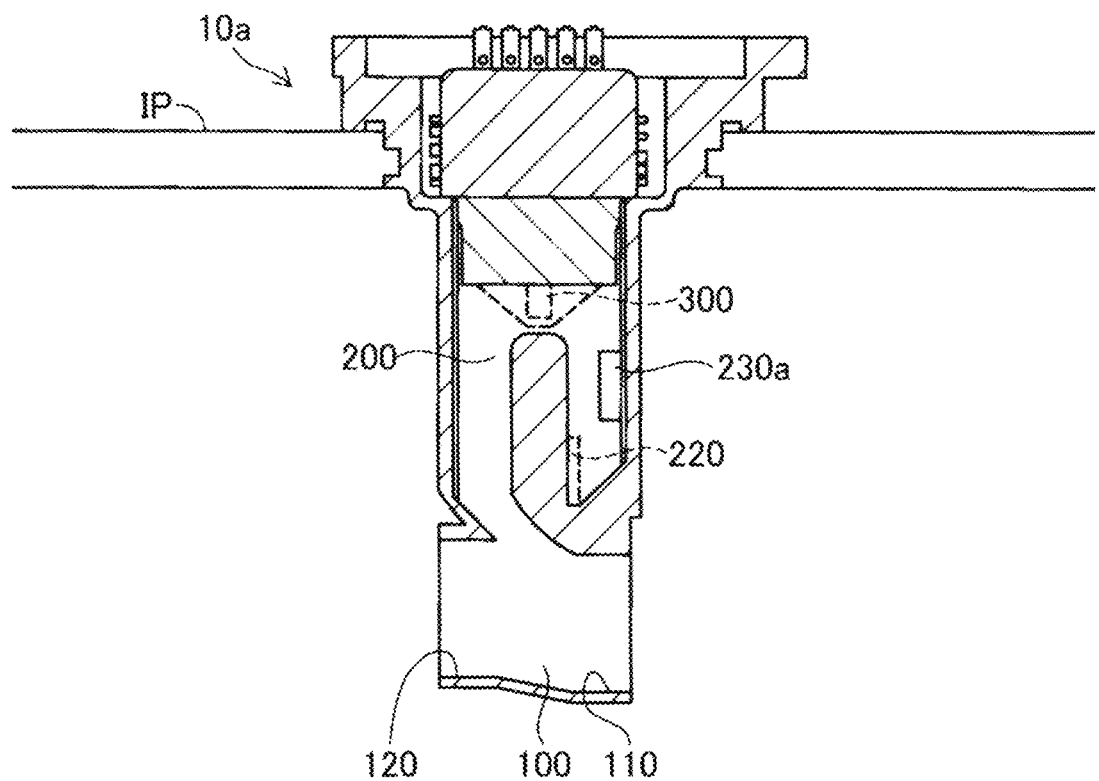
FIG. 16 is a cross-sectional view of a flowmeter of a sixth embodiment.
Figure 16:
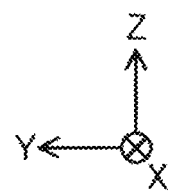

As shown in FIG. 16, a flowmeter 10a of a sixth embodiment shown in FIG. 16 differs from the flowmeter 10 of the first embodiment in that the flowmeter 10a includes a protrusion 230a that is different from the protrusion 230. In the first embodiment, the protrusion 230 protrudes from a portion of the wall surface located on the +X side and +Y side of the second passage 200, but the present disclosure is not limited to this. The protrusion 230a protrudes in the −X direction from a portion of the wall surface located on the +X side and the −Y side of the second passage 200. A cross-sectional shape of the protrusion 230a taken along the XZ plane is triangular. The flowmeter 10a of the sixth embodiment can obtain the same advantages as those of the first embodiment.

Figure 17:
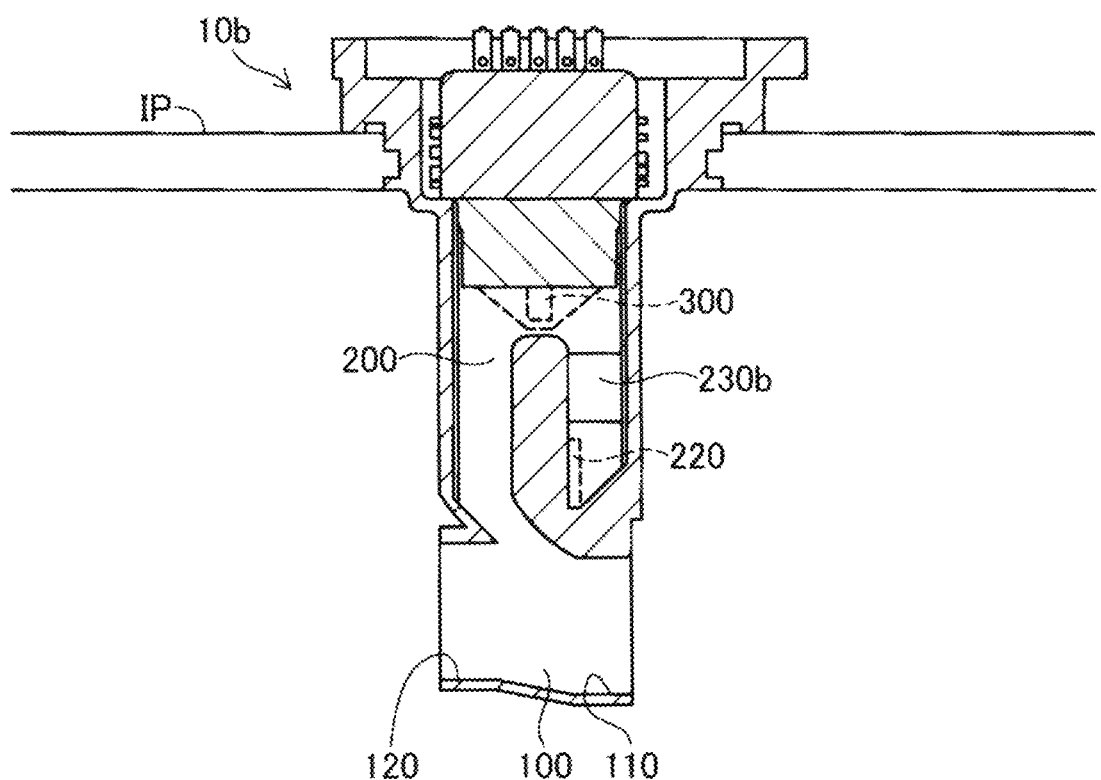
FIG. 17 is a cross-sectional view of a flowmeter of a seventh embodiment.
Figure 17:
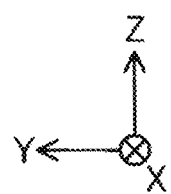
Figure 18:
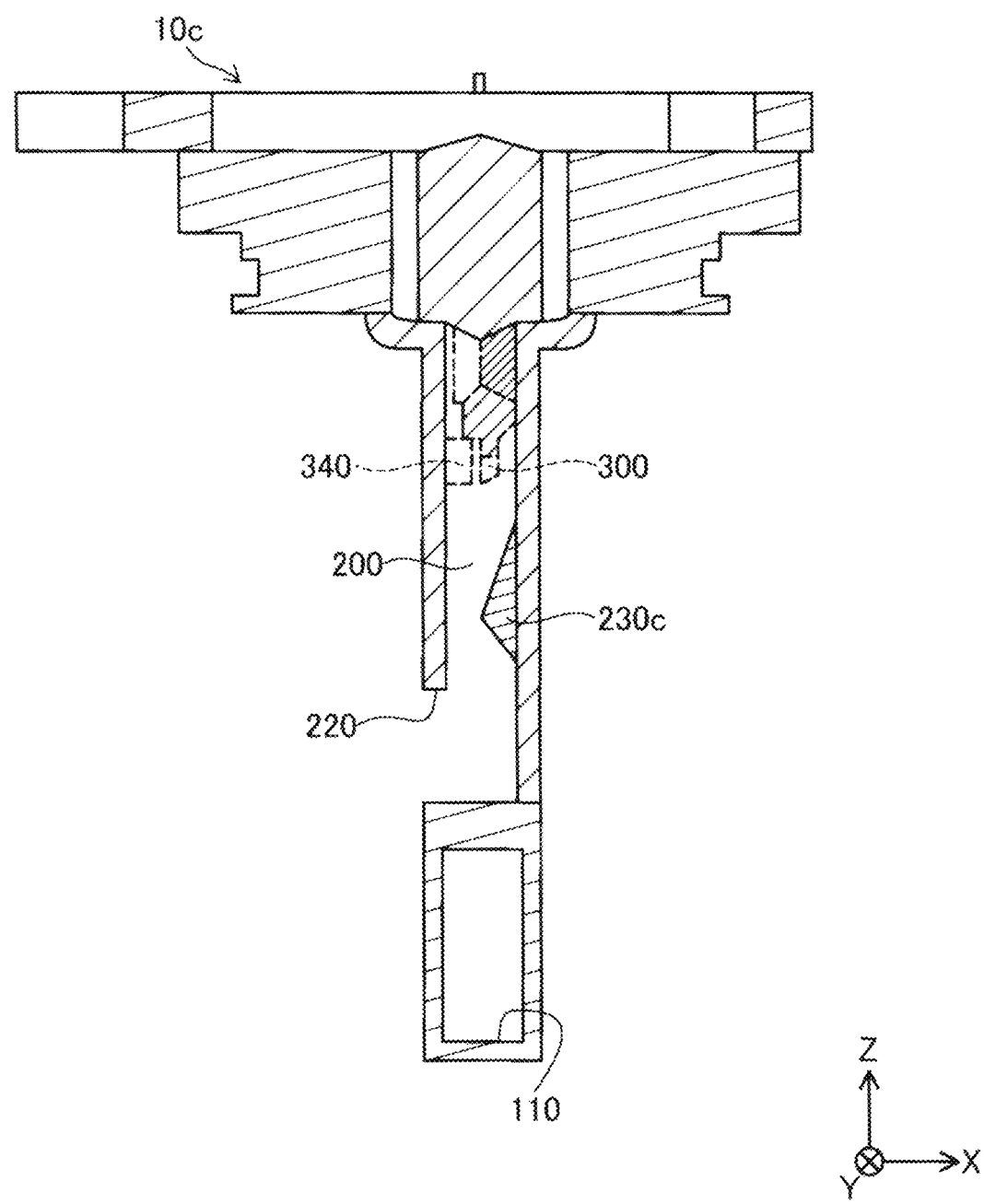
FIG. 18 is a cross-sectional view of a flowmeter of an eighth embodiment.
Figure 19:
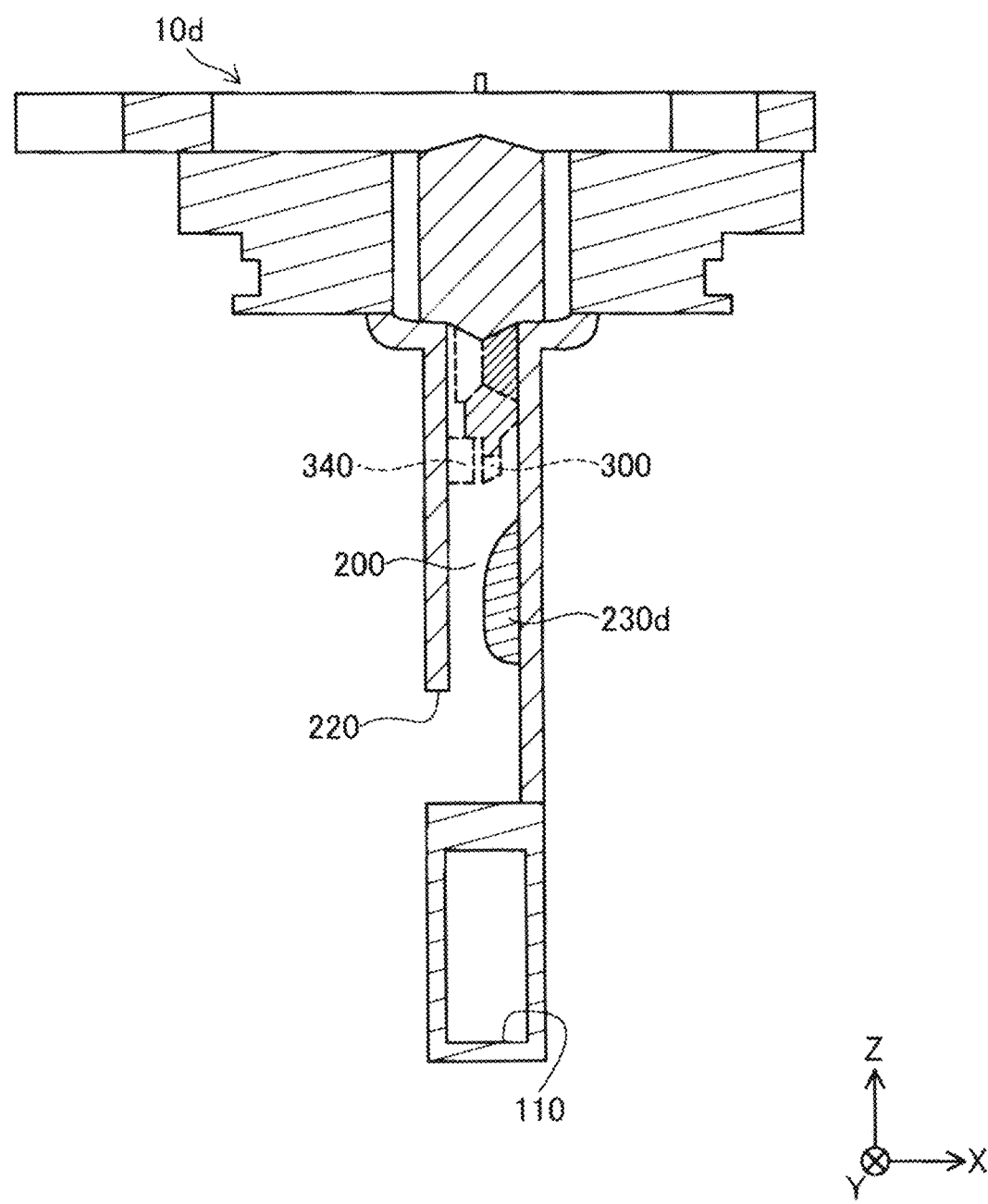
FIG. 19 is a cross-sectional view of a flowmeter of a ninth embodiment.
Figure 20:
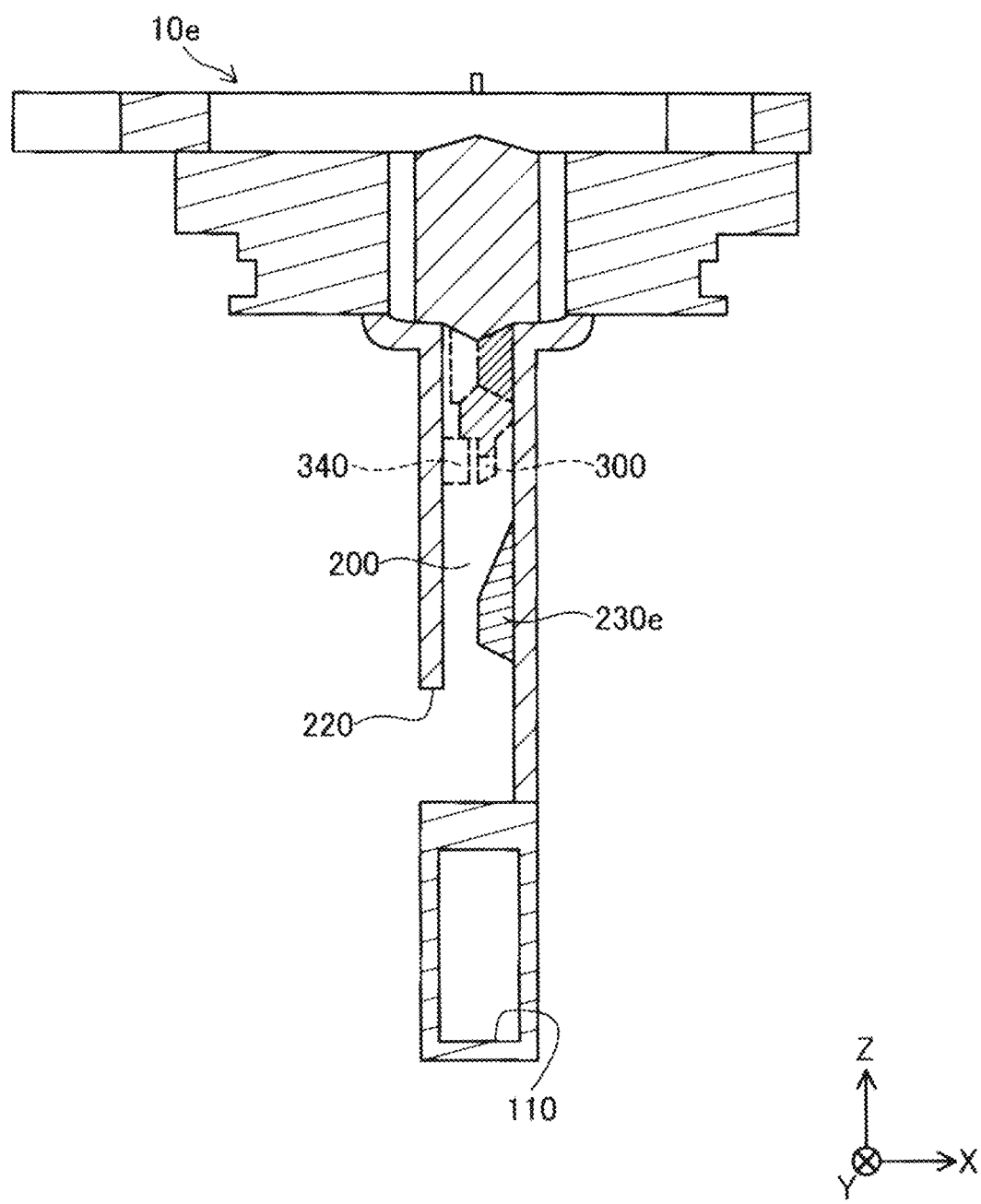
FIG. 20 is a cross-sectional view of a flowmeter of a tenth embodiment.
Figure 21:
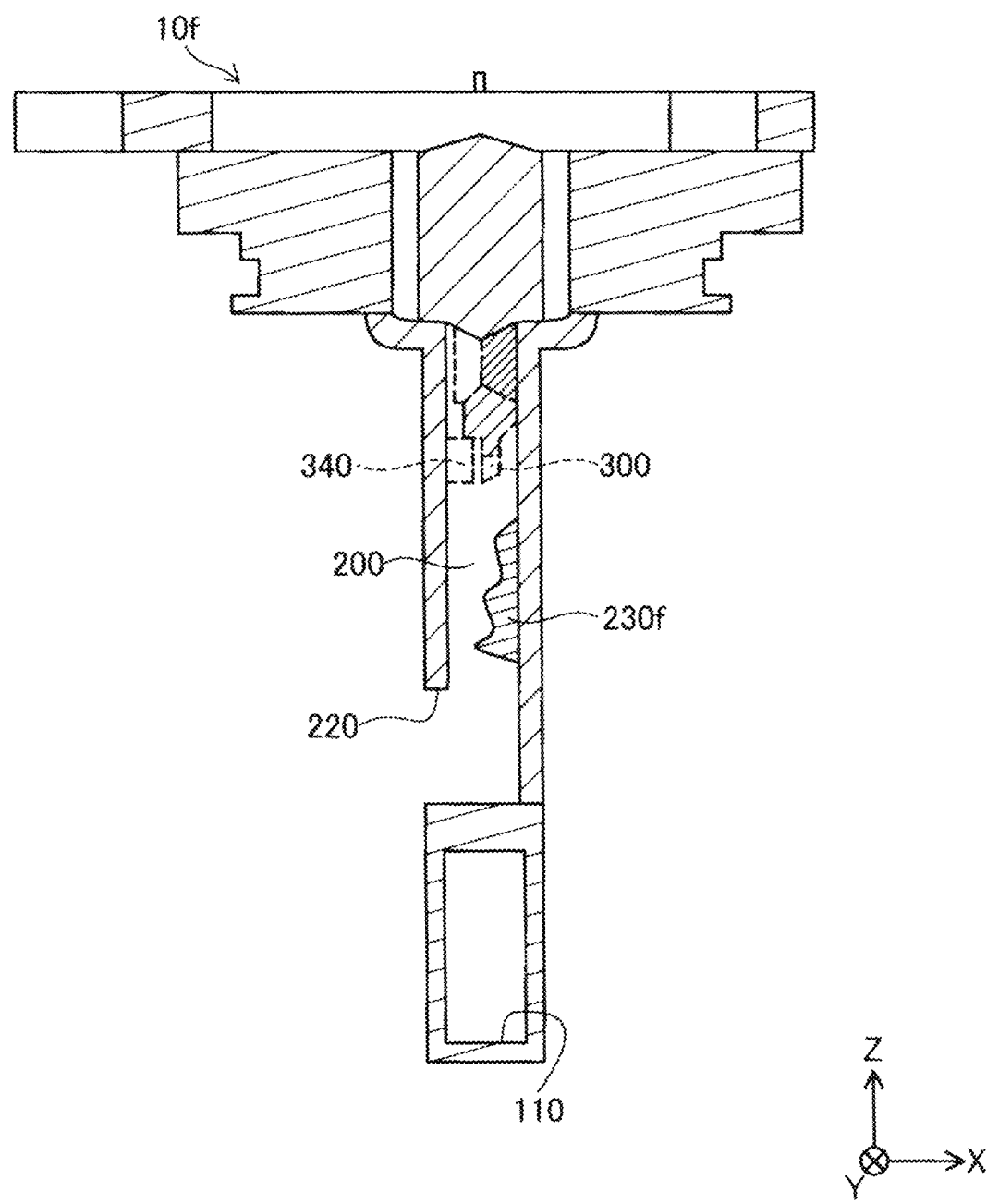
FIG. 21 is a cross-sectional view of a flowmeter of an eleventh embodiment.
Figure 22:
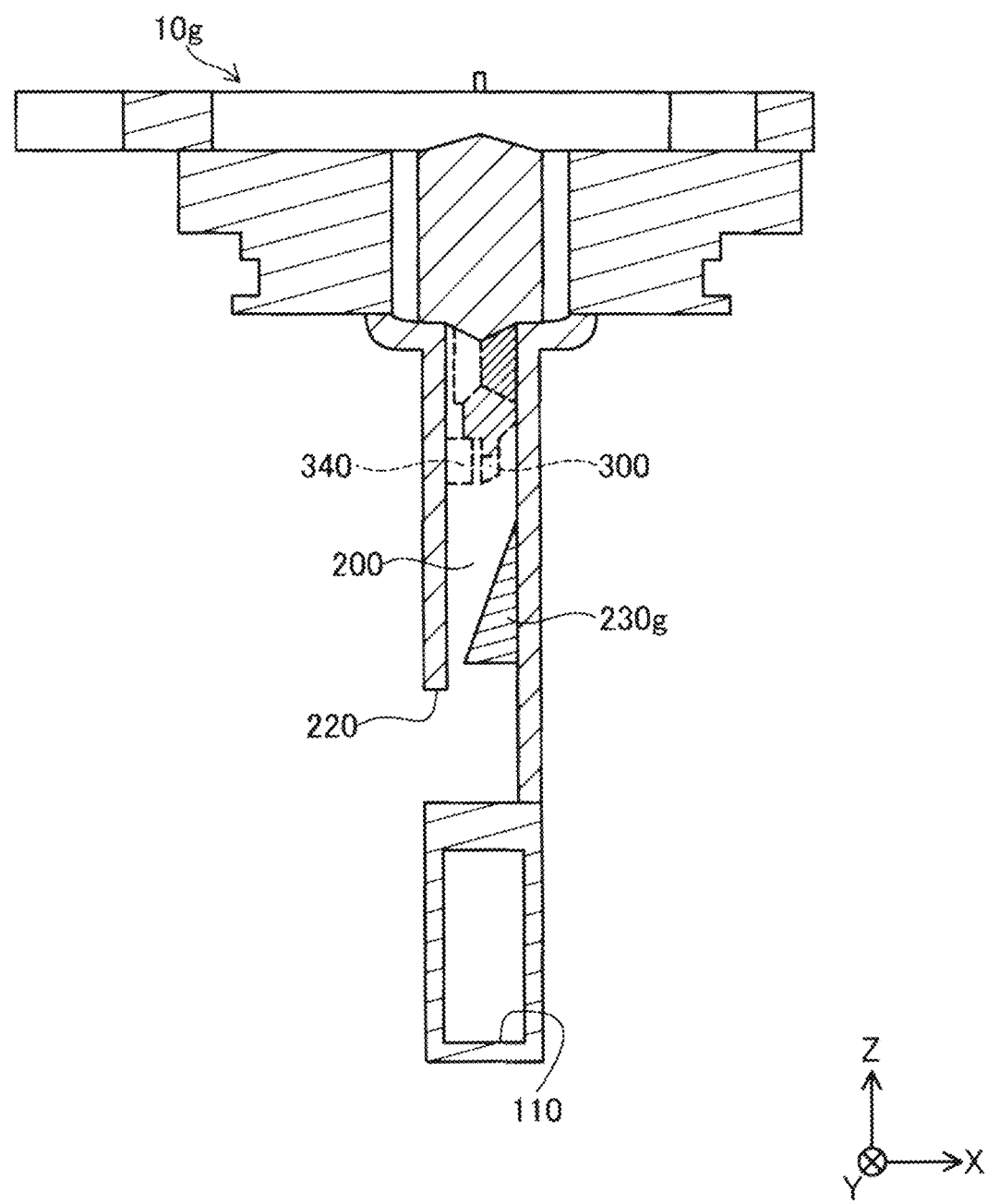
FIG. 22 is a cross-sectional view of a flowmeter of a twelfth embodiment.
Figure 23:
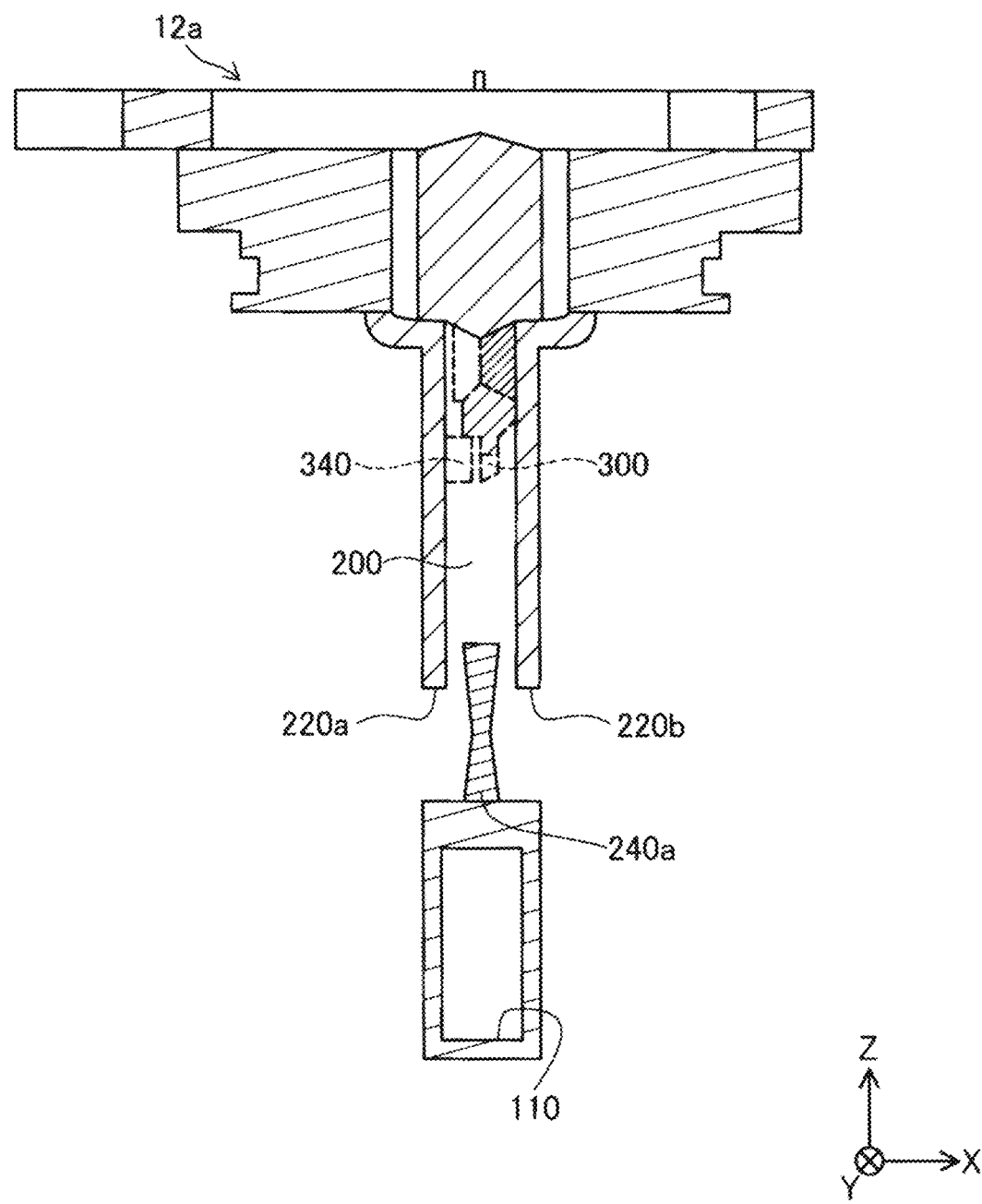
FIG. 23 is a cross-sectional view of a flowmeter of a thirteenth embodiment.
Figure 24:
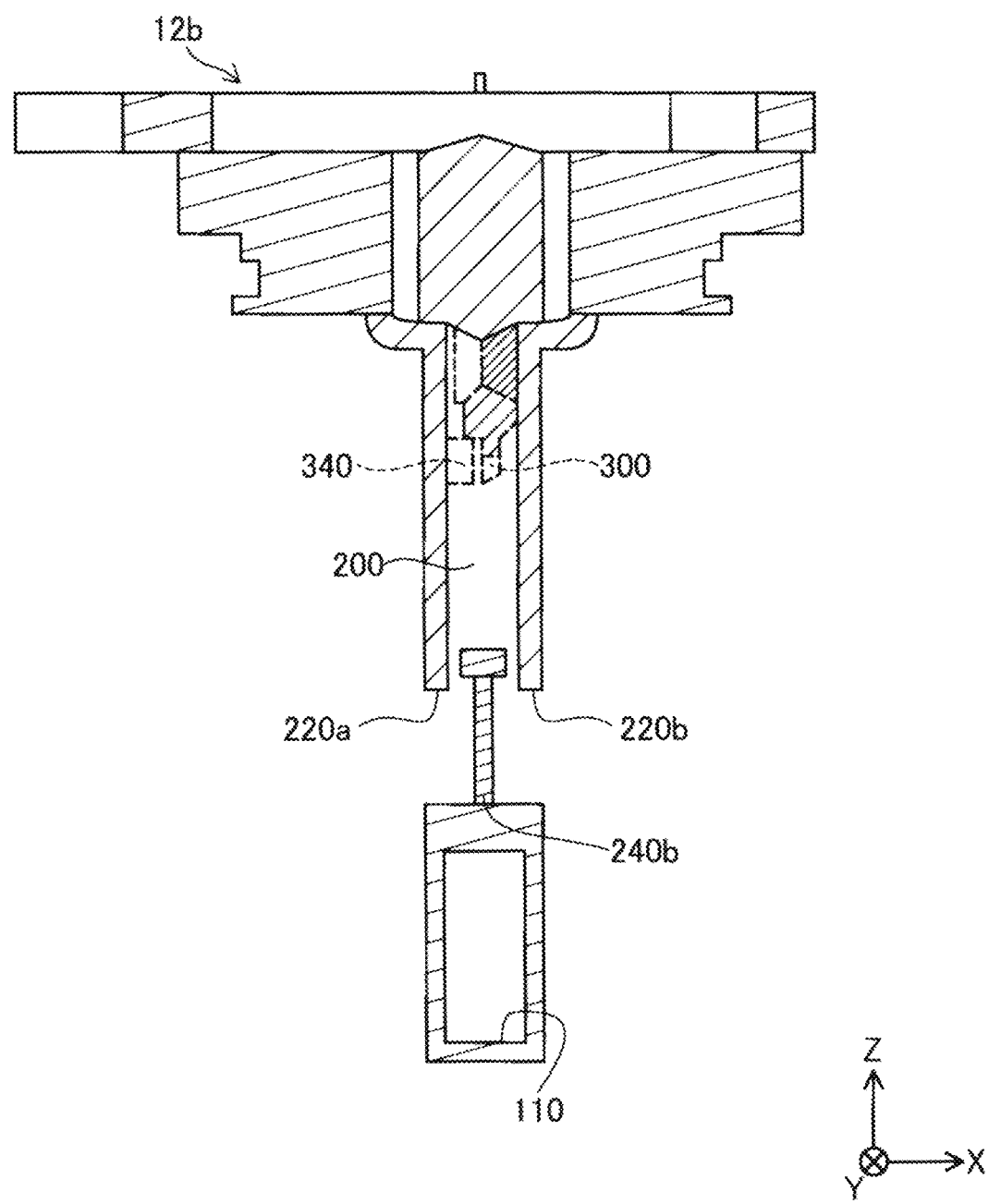
FIG. 24 is a cross-sectional view of a flowmeter of a fourteenth embodiment.
Figure 25:
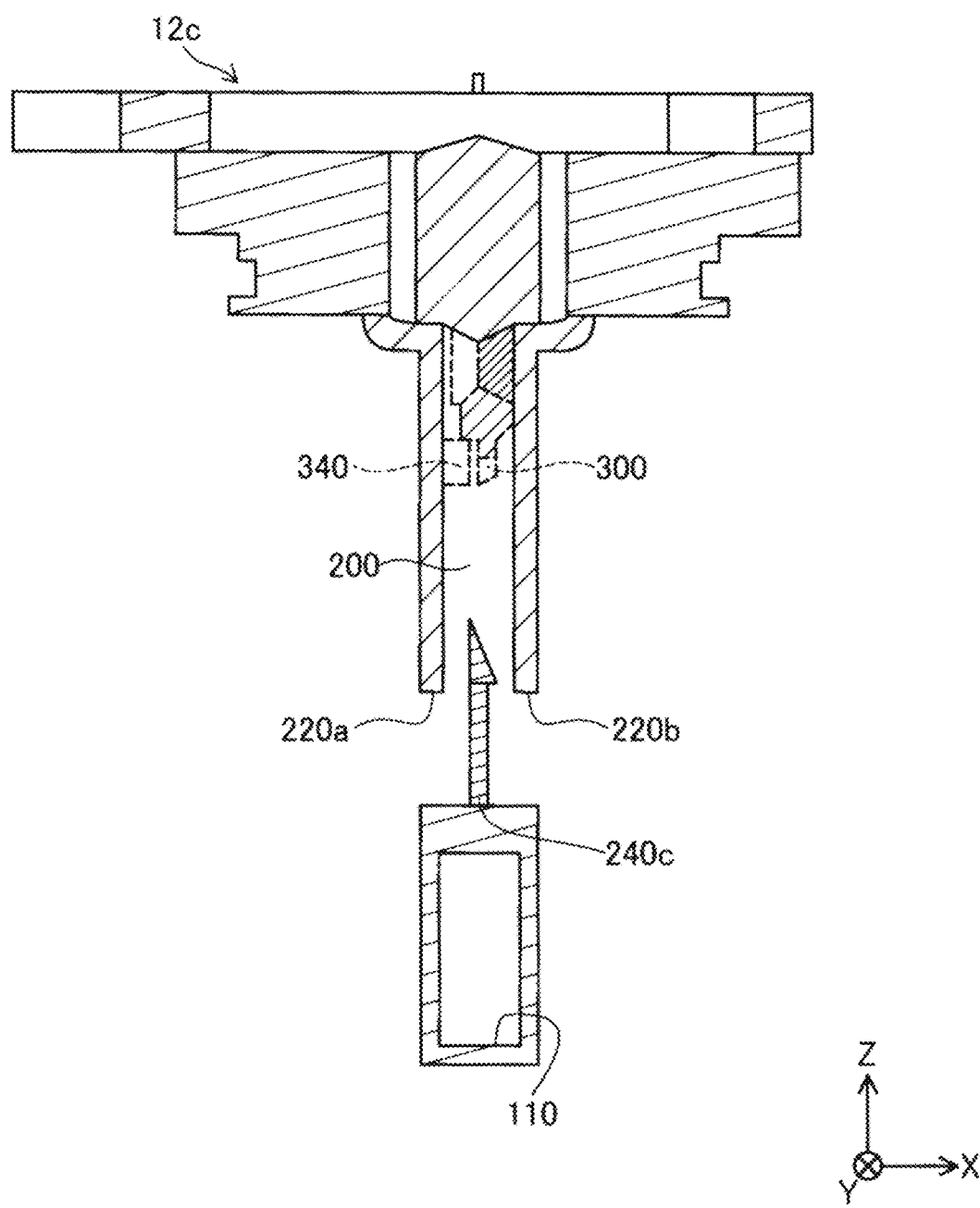
FIG. 25 is a cross-sectional view of a flowmeter of a fifteenth embodiment.
Figure 26:
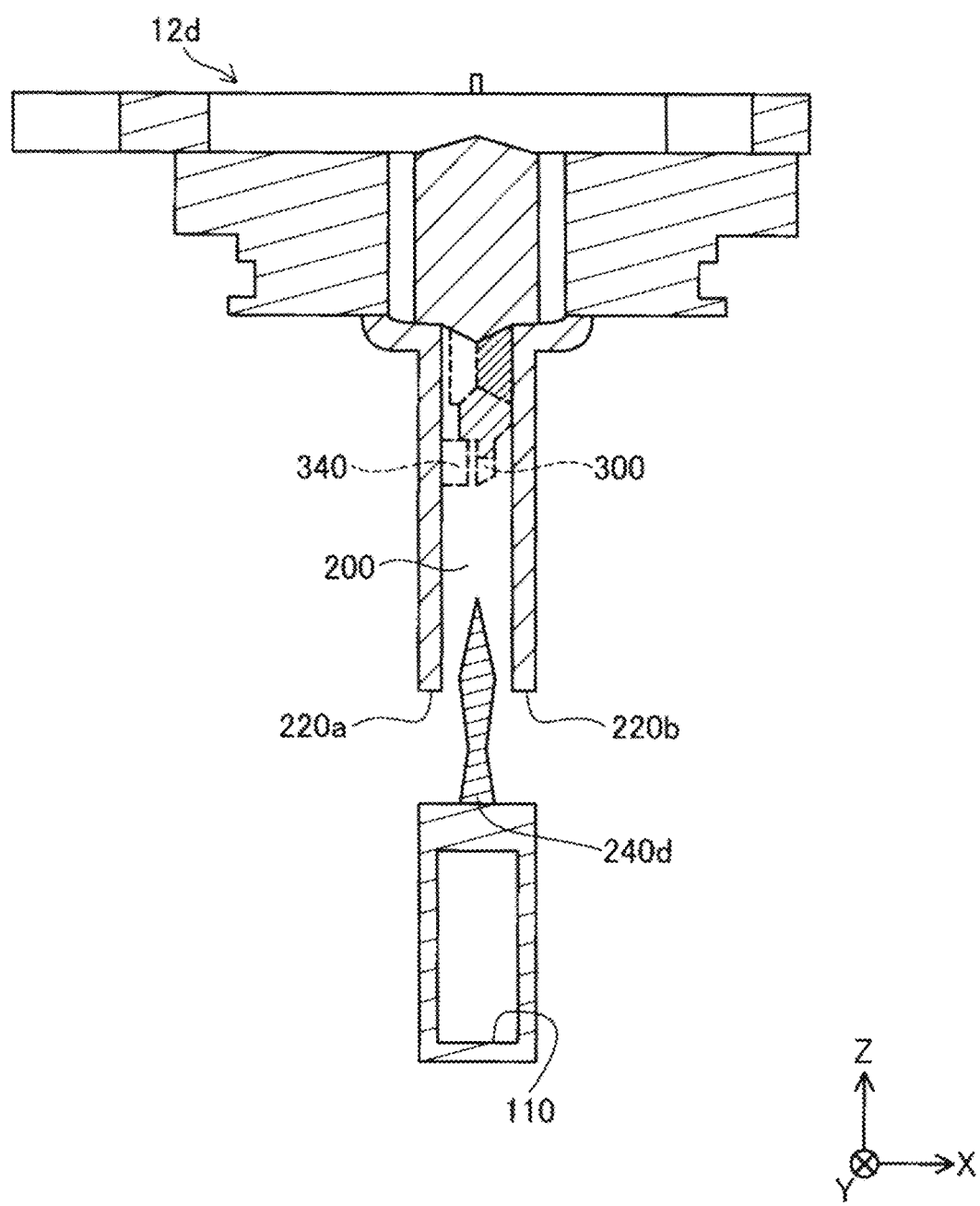
FIG. 26 is a cross-sectional view of a flowmeter of a sixteenth embodiment.
Figure 27:
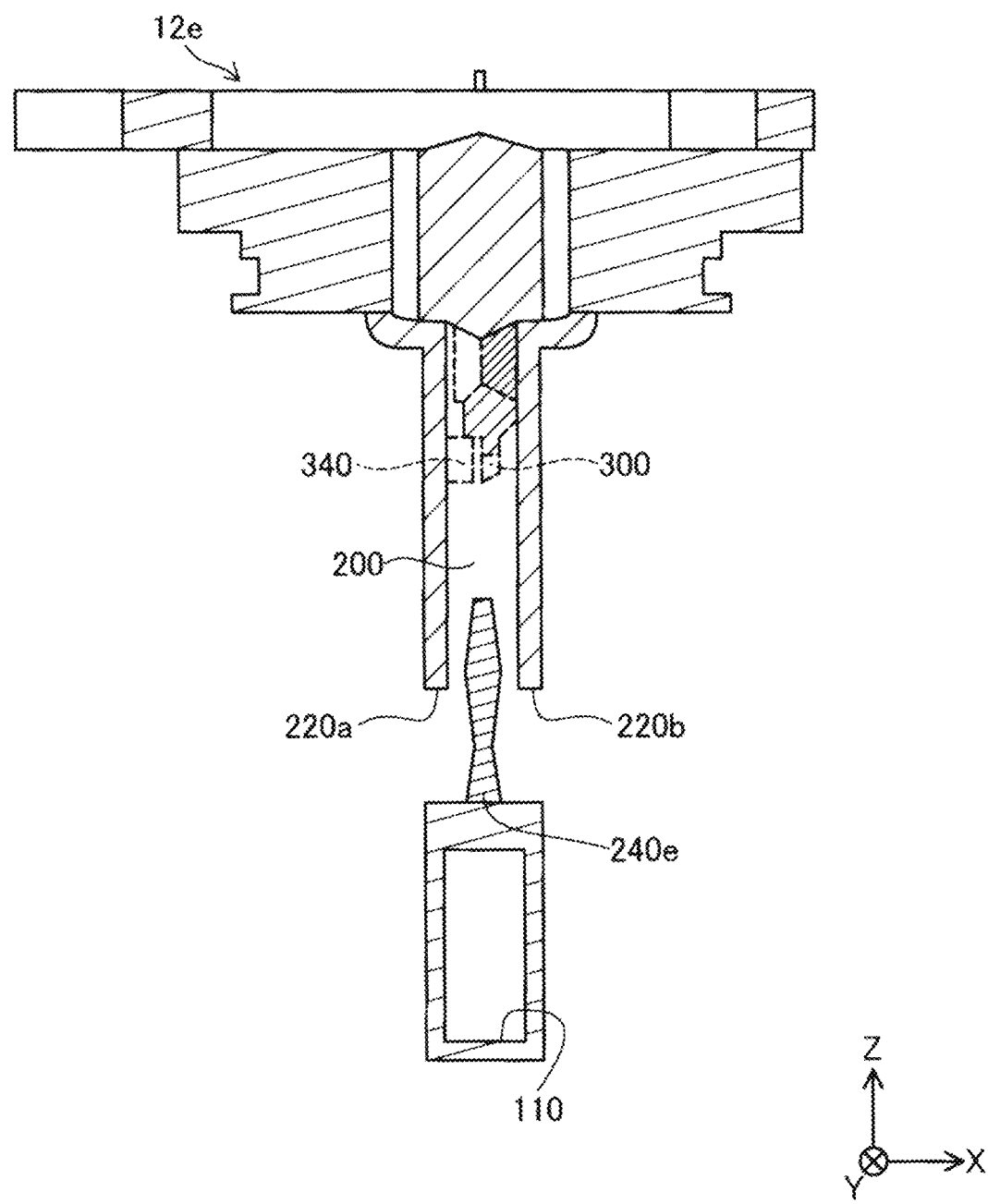
FIG. 27 is a cross-sectional view of a flowmeter of a seventeenth embodiment.
Figure 28:
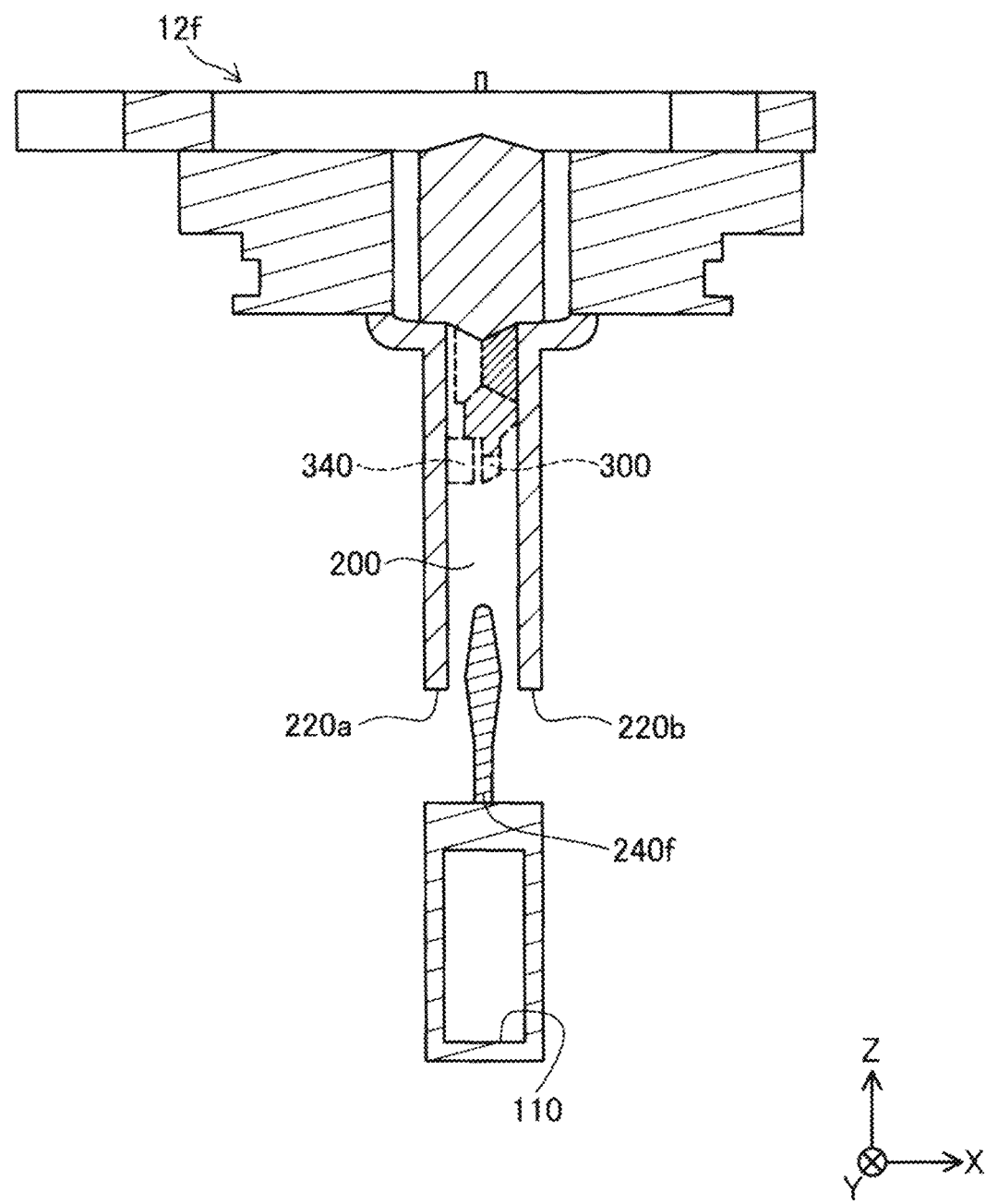
FIG. 28 is a cross-sectional view of a flowmeter of an eighteenth embodiment.

As shown in FIG. 17, a flowmeter 10b of a seventh embodiment differs from the flowmeter 10 of the first embodiment in that the flowmeter 10b includes a protrusion 230b that is different from the protrusion 230. The protrusion 230b protrudes in the −X direction from a facing surface of the wall surface that faces the end opening 220 and is located on the +X side of the second passage 200. The protrusion 230b extends entirely in the Y direction in a portion of the second passage 200. A cross-sectional shape of the protrusion 230b taken along the XZ plane is triangular. The flowmeter 10b of the seventh embodiment can obtain the same advantages as those of the first embodiment.

As shown in FIGS. 18 to 22, flowmeters 10c-10g of eighth to twelfth embodiments differ from the flowmeter 10 of the first embodiment in that they include protrusions 230c to 230g that are different from the protrusion 230. Other configurations are similar to those of the first embodiment. A cross-sectional shape of each of the protrusions taken along the XZ plane is not limited to the shape of the first embodiment and may be a shape as shown in protrusions 230c to 230g in FIGS. 18 to 22. The flowmeter 10c to 10g of the eighth to twelfth embodiments can obtain the same advantages as those of the first embodiment.

As shown in FIGS. 23 to 28, flowmeters 12a to 12g of thirteenth to eighteenth embodiments differ from the flowmeter 12 of the second embodiment in that they include partitions 240a to 240f that are different from the partition 240 of the second embodiment. Other configurations are similar to those of the second embodiment. A shape of the partition is not limited to the shape in the second embodiment and may be shapes of partitions 240a to 240f shown in FIGS. 23 to 28. The flowmeters 12a to 12f of the thirteenth to eighteenth embodiments can obtain the same advantages as those of the second embodiment. The partition may be formed into a shape such that the flow resistance of the fluid flowing from the flow rate detector 300 to the end opening 220a and the end opening 220b is less than the flow resistance of the fluid flowing from the end opening 220a and the end opening 220b to the flow rate detector 300. The flowmeter having such partition can make it easy to generate a vortex by blocking the fluid flowing into the flowmeter through the end opening 220 by the protrusion 230 while the fluid flows smoothly into the first passage 100 toward the end opening 220.

Figure 29:
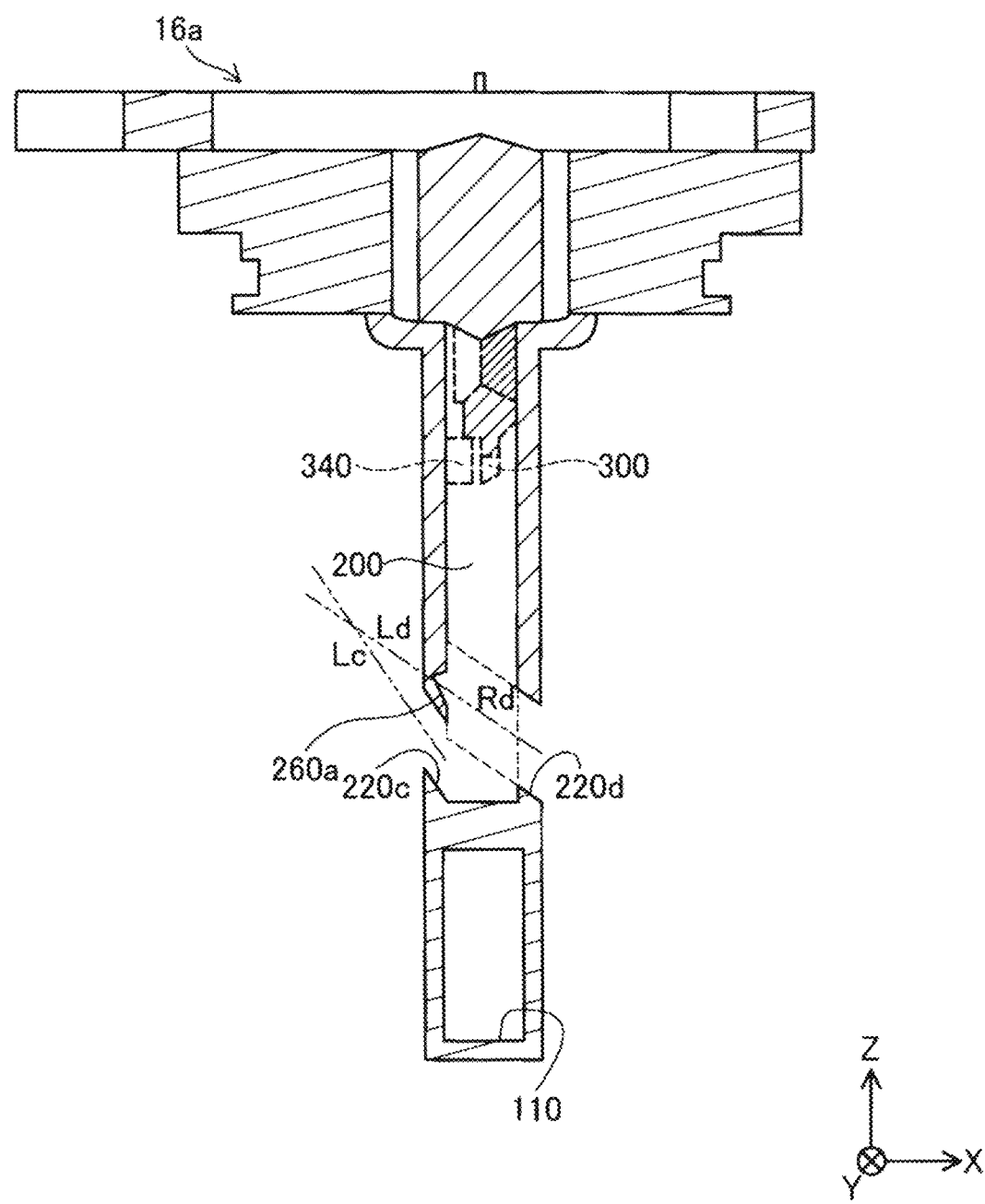
FIG. 29 is a cross-sectional view of a flowmeter of a nineteenth embodiment.
Figure 30:
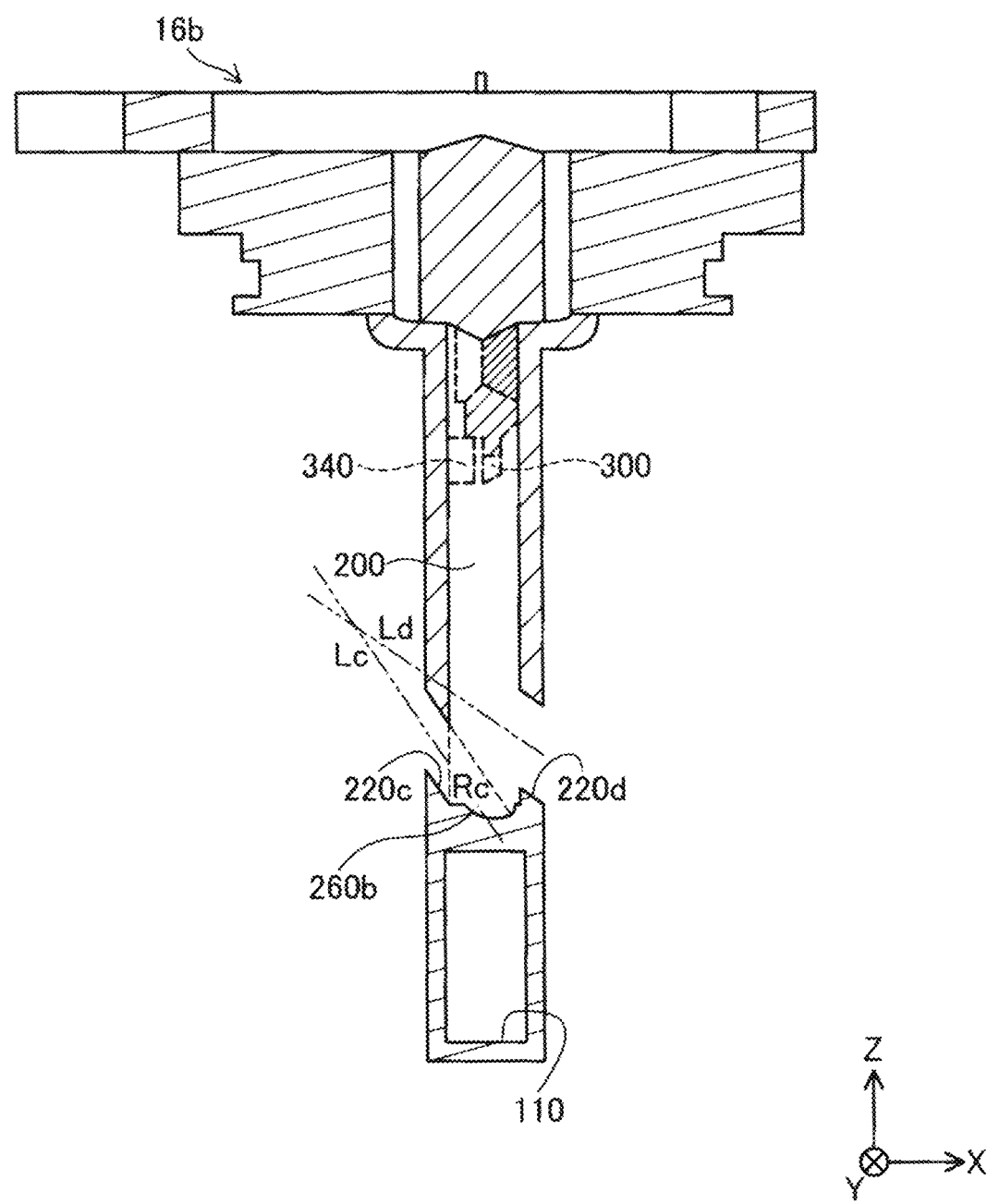
FIG. 30 is a cross-sectional view of a flowmeter of a twentieth embodiment.
Figure 31:
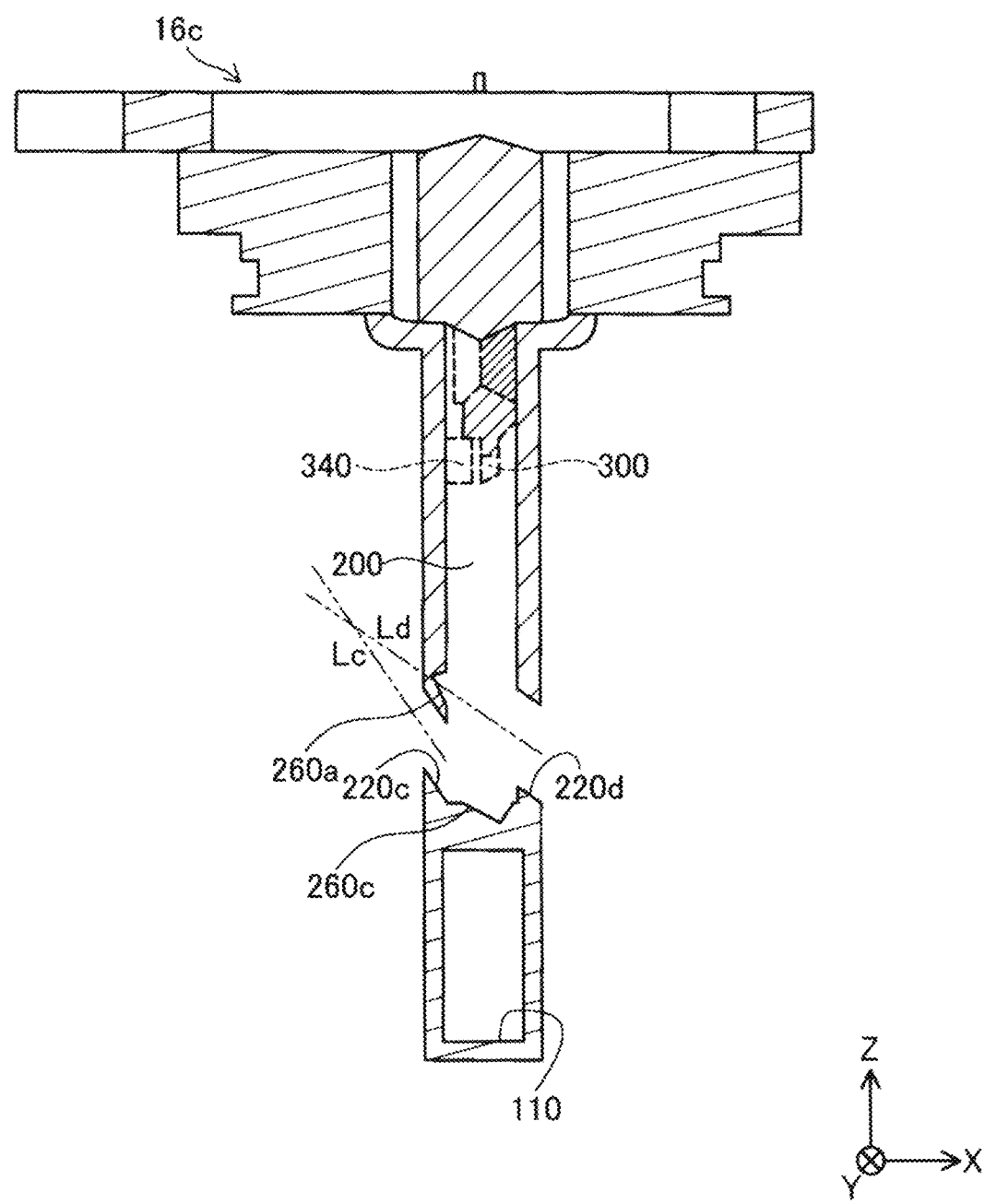
FIG. 31 is a cross-sectional view of a flowmeter of a twenty-first embodiment.
Figure 32:
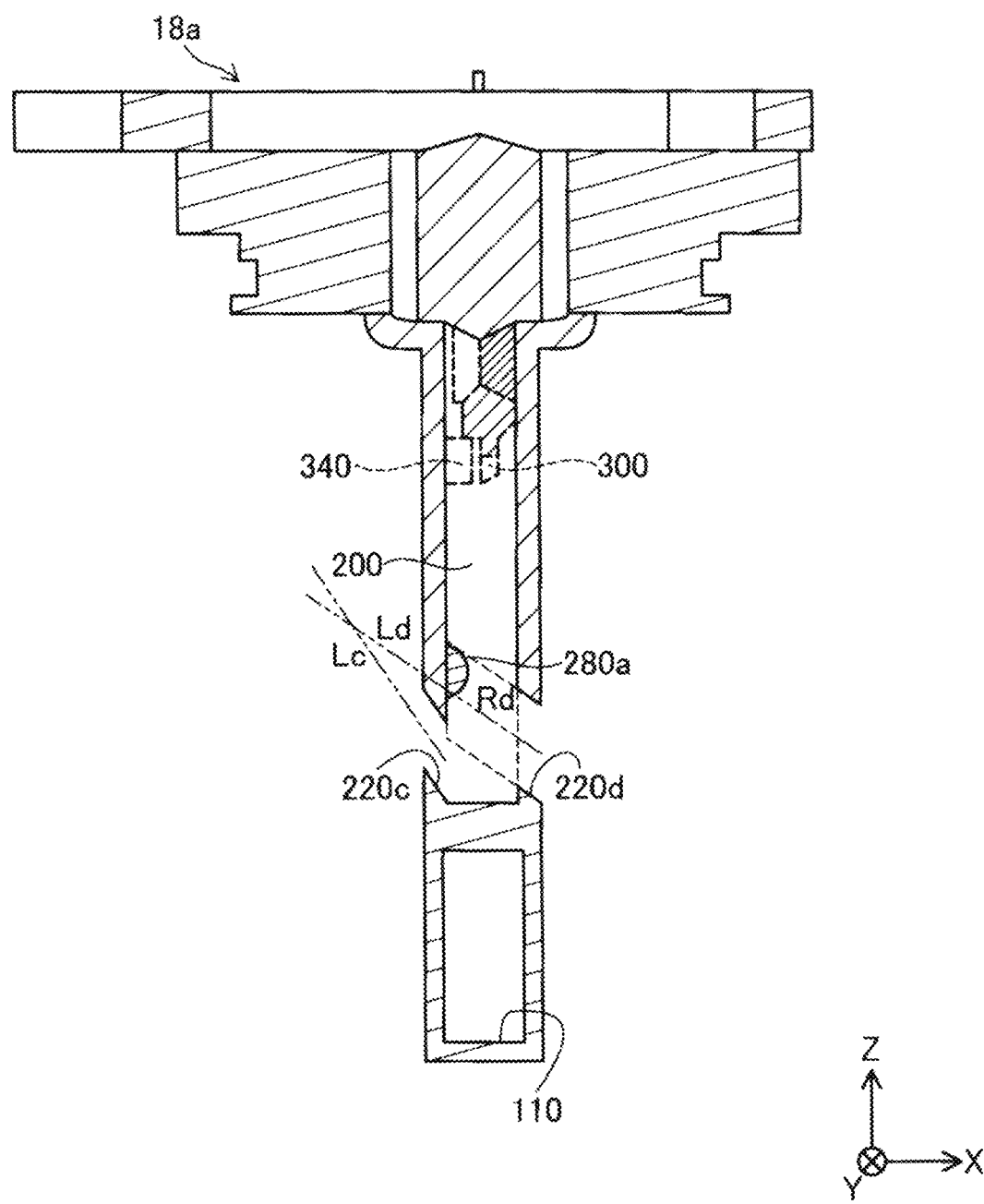
FIG. 32 is a cross-sectional view of a flowmeter of a twenty-second embodiment.
Figure 33:
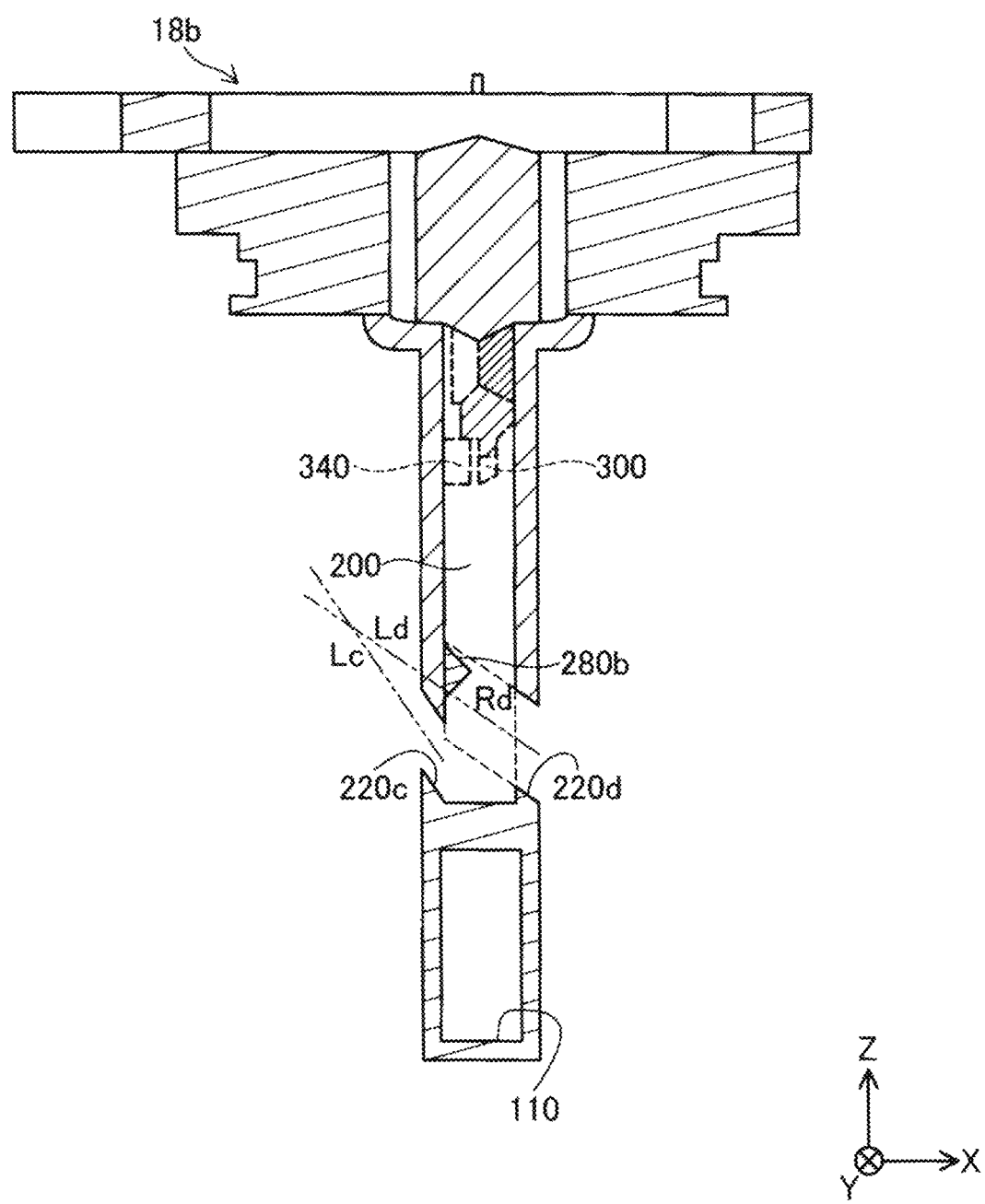
FIG. 33 is a cross-sectional view of a flowmeter of a twenty-third embodiment.
Figure 34:
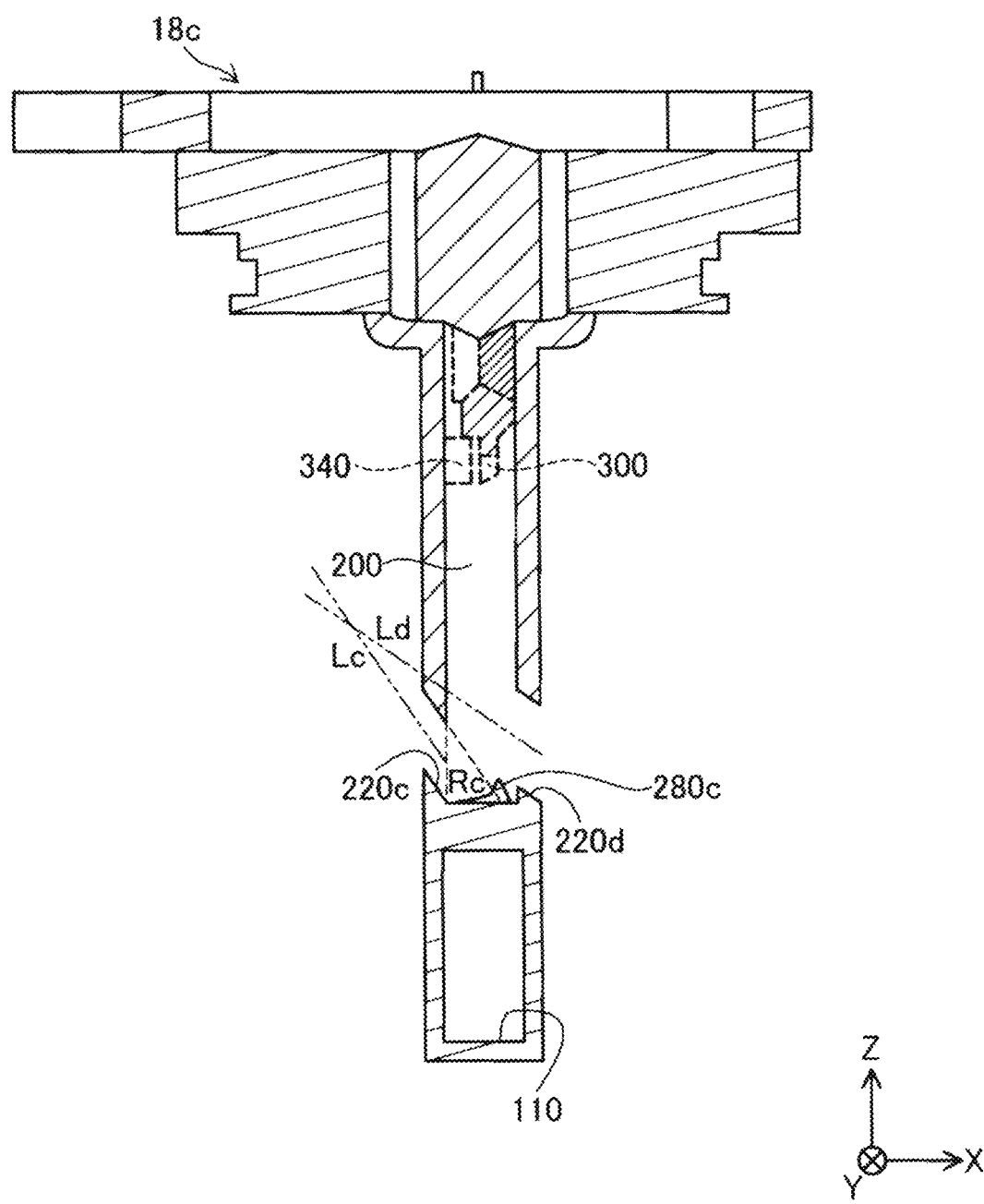
FIG. 34 is a cross-sectional view of a flowmeter of a twenty-fourth embodiment.

As shown in FIGS. 29-31, flowmeters of nineteenth to twenty-first embodiments differ from the flowmeter 16 of the fourth embodiment in that they include recesses 260a to 260c that are different from the recess 260. Other configurations are similar to those of the configurations in the fourth embodiment. A shape of the recess 260 is not limited to the shape shown in the fourth embodiment and may be a shape defined by a combination of flat surfaces as described in the recess 260a in FIG. 29. In the fourth embodiment, the recess 260 is entirely disposed within the range Rd of the wall surface of the second passage 200, but the present disclosure is not limited to this. As described in a recess 260b in FIG. 30, a portion of the recess 260b may be disposed in the range Rc of the wall surface of the second passage 200. The range Rc is formed by projecting the end opening 220c onto the wall surface of the second passage 200 along the line segment Lc. The number of the recesses 260 is not limited to one as shown in the fourth embodiment, and the number of the recesses 260 may be two as shown in the recess 260a and the recess 260c in FIG. 31. The flowmeters 16a to 16c of the nineteenth to twenty-first embodiment can obtain the same advantages as those of the fourth embodiment.

Figure 35:
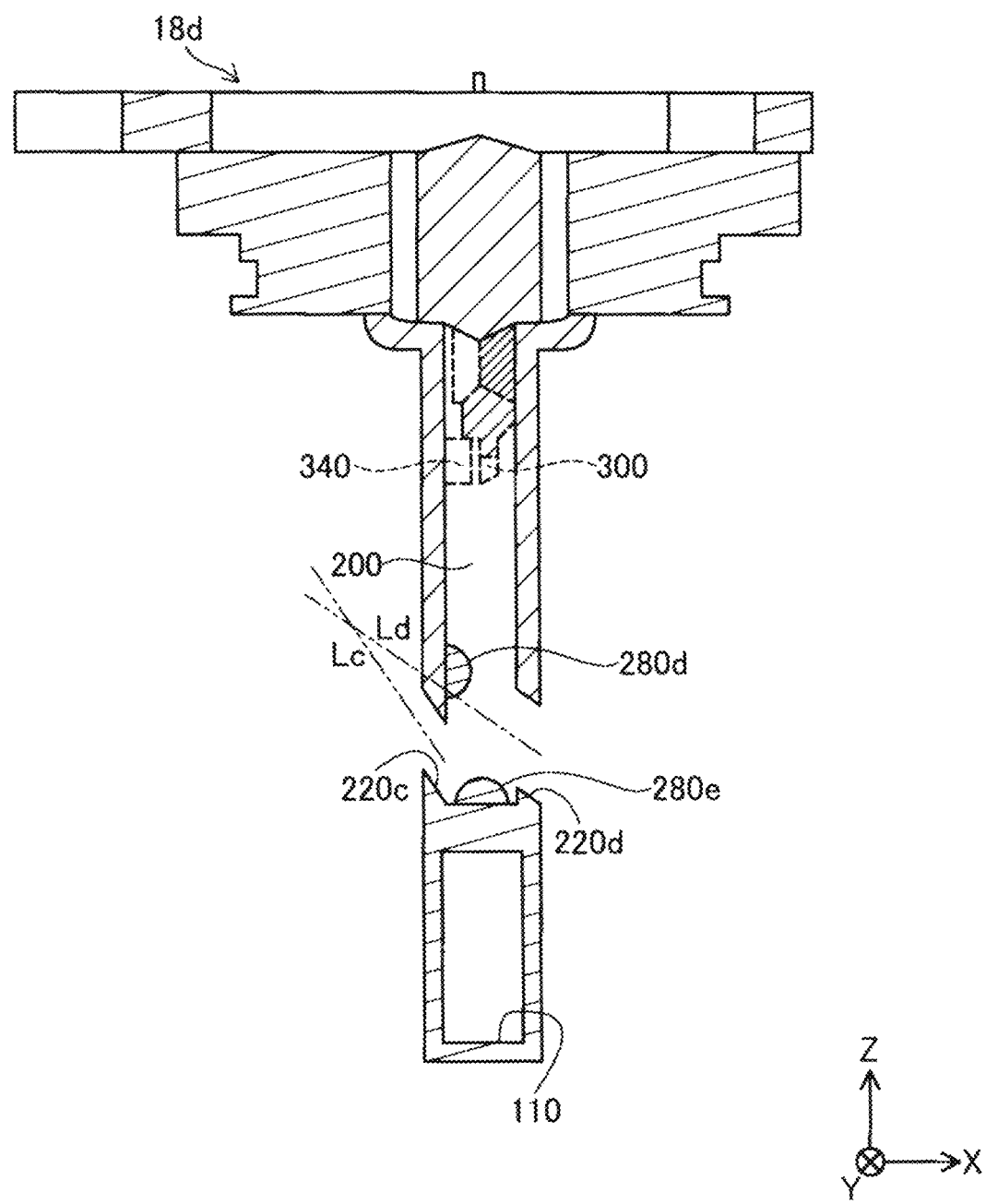
FIG. 35 is a cross-sectional view of a flowmeter of a twenty-fifth embodiment.

As shown in FIGS. 32 to 35, flowmeters 18a to 18d of twenty-second to twenty-fifth embodiments differ from the flowmeter 18 of the fifth embodiment in that they include protrusions 280a to 280e that are different from the protrusion 280. Other configurations are similar to those of the fifth embodiment. A shape of the protrusion 280 is not limited to a shape in the fifth embodiment and may be shapes as described in the protrusion 280a and the protrusion 280b shown in FIGS. 32 to 33. In the fifth embodiment, the entire of the protrusion 280 protrudes into the second passage 200 from a portion of the wall surface of the second passage 200 within the range Rd, but the present disclosure is not limited to this. As shown in the protrusion 280c in FIG. 34, a part of the protrusion 280c may protrude from the portion of the wall surface of the second passage 200 within the range Rc. The number of the protrusions 280 is not limited one as shown in the fifth embodiment. The number of the protrusions may be two like the protrusion 280d and the protrusion 280e as shown in FIG. 35. The flowmeters 18a to 18d of the twenty-second to the twenty-fifth embodiments can obtain the same advantages as those of the fifth embodiment.

Figure 36:
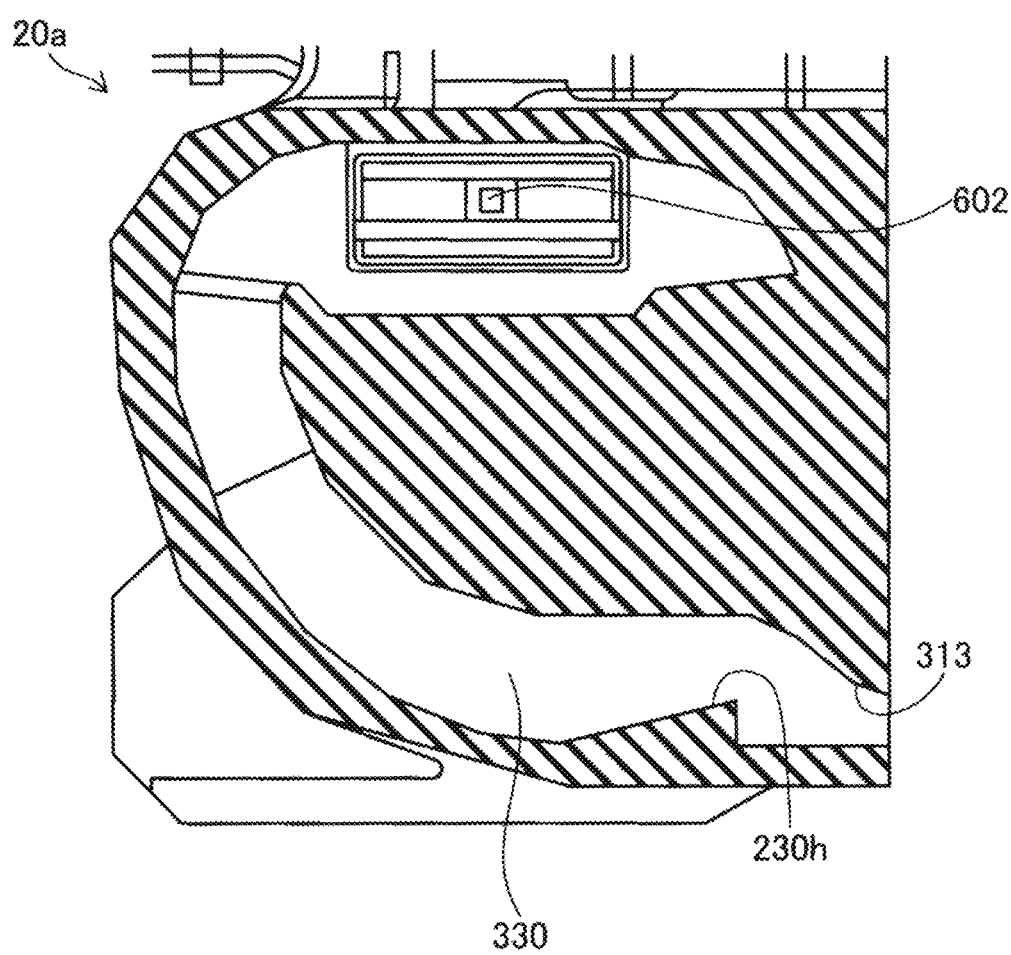
FIG. 36 is a cross-sectional view of a flowmeter of a twenty-sixth embodiment.
Figure 37:
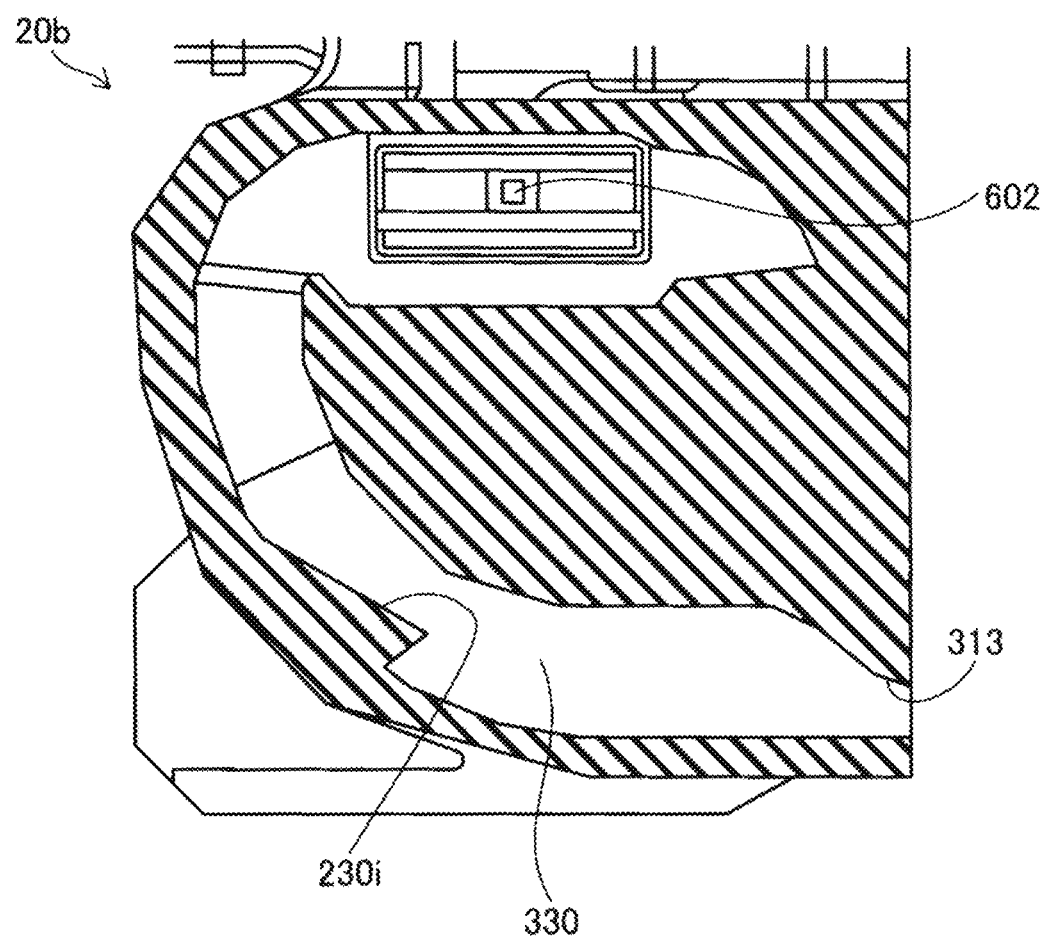
FIG. 37 is a cross-sectional view of a flowmeter of a twenty-seventh embodiment.
Figure 38:
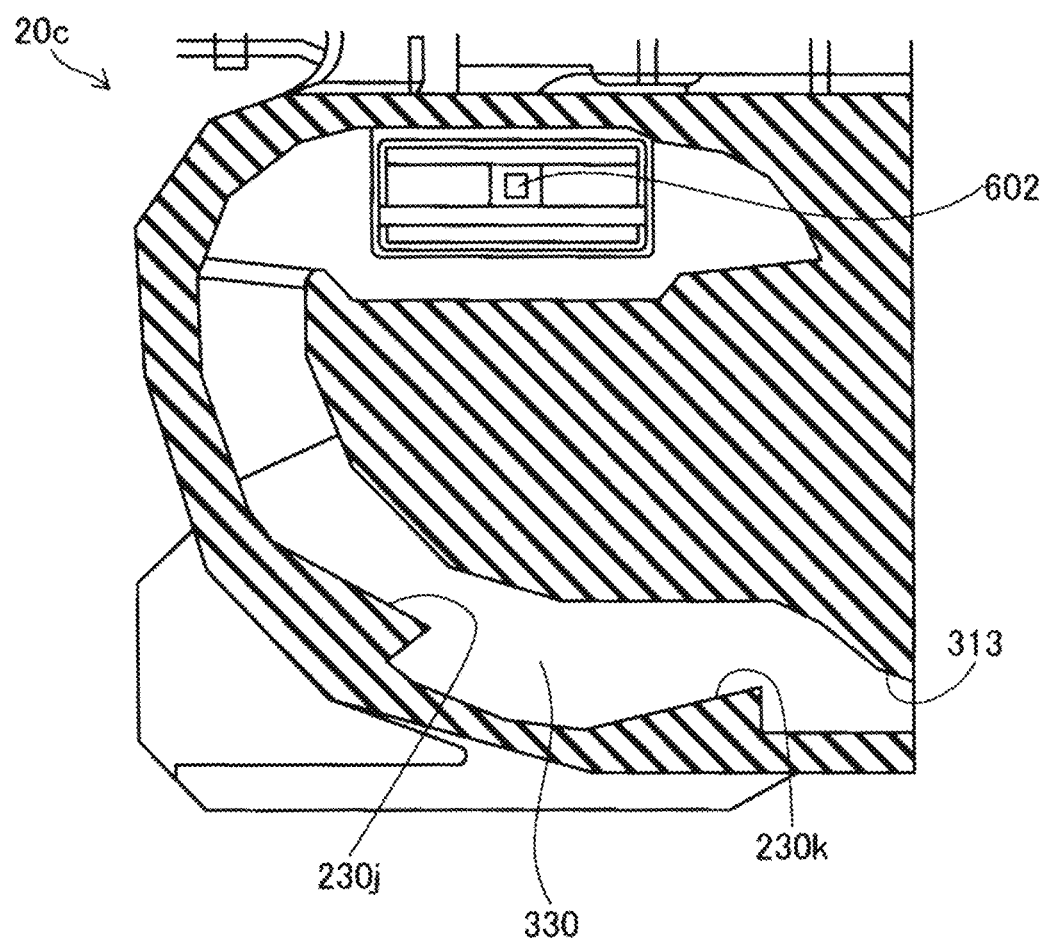
FIG. 38 is a cross-sectional view of a flowmeter of a twenty-eighth embodiment.

As shown in FIGS. 36 to 38, flowmeters 20a to 20c in twenty-sixth to twenty-eighth embodiments are modifications of a thermal type flowmeter disclosed in WO2017/073276 A1. Regarding the flowmeters 20a to 20c shown in FIGS. 36 to 38, only a second outlet 313, a front side sub passage recess 330, and a flow rate detector 602 are donated by reference numerals in the same configuration with the thermal type flow meter without modification. Each of the flowmeters 20a to 20c includes a protrusion 230h to 230k that protrudes from a wall surface of the front side sub passage recess 330 between the flow rate detector 602 and the second outlet 313 Also in the flowmeters 20a to 20c, even if the fluid flows into the flowmeters 20a to 20c through the second outlet 313, the fluid is reflected at the protrusions 230h to 230k to generate a vortex, so that the fluid is restricted from flowing into the flowmeters 20a to 20c through the second outlet 313.

Figure 39:
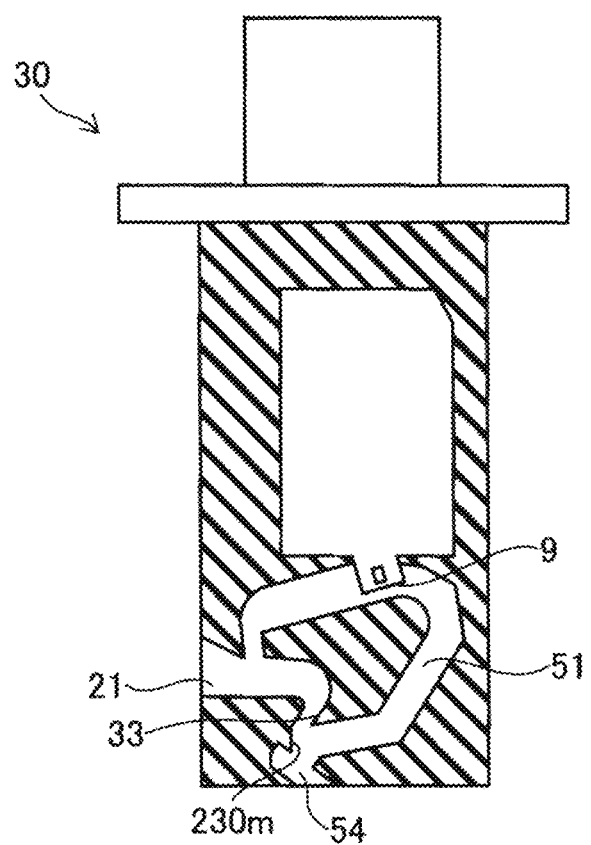
FIG. 39 is a cross-sectional view of a flowmeter of a twenty-ninth embodiment.

A flowmeter 30 of a twenty-ninth embodiment in FIG. 39 is a modification of a device disclosed in JP 2004-519690 A. Regarding the flowmeter 30 in FIG. 39, only a measurement element 9, an inlet opening 21, an exhaust opening 33, a turning guide passage 51, and an outlet opening 54 are donated by reference numerals in the same configurations with the device without modification for descriptive purposes. The flowmeter 30 includes a protrusion 230m protruding from a wall surface of the turning guide passage 51 between the measurement element 9 and the outlet opening 54. Also in the flowmeter 30, even if the fluid flows into the flowmeter 30 through the outlet opening 54, the fluid is reflected at the protrusion 230m to generate a vortex, so that the fluid is restricted from flowing into the flowmeter 30 through the outlet opening 54 in the backward direction.

A flowmeter of a thirtieth embodiment includes the protrusion 280 of the flowmeter 18 of the fifth embodiment compared to the flowmeter 16 of the fourth embodiment shown in FIG. 12. That is, the flowmeter is not limited to a configuration in which the flowmeter includes either the recess 260 or the protrusion 280 and may have both the recess 260 and the protrusion 280.

The present disclosure should not be limited to the embodiments described above and modifications and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A flowmeter disposed in a passage through which a fluid flows, the flowmeter comprising:
   a first passage defining an opening through which a part of the fluid flows into the flowmeter from the passage; and
   a second passage branching off from the first passage and including a flow rate detector that is configured to detect a flow rate of the fluid flowing through the second passage from the first passage, wherein the second passage has one end at which the second passage branches off from the first passage and the other end opposite to the one end, the second passage includes:

at least one end opening at the other end of the second passage; and an inflow reducer configured to restrict the fluid from flowing into the second passage through the at least one end opening, the second passage has a single end opening as the at least one end opening, the inflow reducer is a protrusion protruding into the second passage from a wall surface of the second passage, the wall surface is a part of the second passage between the flow rate detector and the single end opening, and the protrusion has a cross-section having a quadrangle shape or a triangle shape.

2. The flowmeter according to claim 1, wherein the wall surface has a facing surface that faces the single end opening, and the protrusion protrudes from the facing surface.

3. The flowmeter according to claim 1, wherein when the single end opening is projected onto the wall surface in a direction along a center line of the single end opening, the protrusion does not overlap with a projection of the single end opening on the wall surface.

4. The flowmeter according to claim 1, wherein the protrusion is formed into a shape such that a flow resistance of the fluid flowing from the flow rate detector to the single end opening is less than a flow resistance of the fluid flowing from the single end opening to the flow rate detector.

5. A flowmeter disposed in a passage through which a fluid flows, the flowmeter comprising:

a first passage defining an opening through which a part of the fluid flows into the flowmeter from the passage; and a second passage branching off from the first passage and including a flow rate detector that is configured to detect a flow rate of the fluid flowing through the second passage from the first passage, wherein the second passage has one end at which the second passage branches off from the first passage and the other end opposite to the one end, the second passage includes:

at least one end opening at the other end of the second passage; and an inflow reducer configured to restrict the fluid from flowing into the second passage through the at least one end opening, the second passage has two end openings facing each other as the at least one end opening, the inflow reducer is a partition that partitions off one of the two end openings from the other of the two end openings, the partition includes:

a thin portion that is a portion of the partition overlapping with the two end openings; and a thick portion that is a portion of the partition between the flow rate detector and the thin portion, and the thin portion is thinner than the thick portion.

6. The flowmeter according to claim 5, wherein the partition is formed into a shape such that a flow resistance of the fluid flowing from the flow rate detector to the two end openings is less than a flow resistance of the fluid flowing from the two end openings to the flow rate detector.

7. A flowmeter disposed in a passage through which a fluid flows, the flowmeter comprising:

a first passage defining an opening through which a part of the fluid flows into the flowmeter from the passage; and a second passage branching off from the first passage and including a flow rate detector that is configured to detect a flow rate of the fluid flowing through the second passage from the first passage, wherein the second passage has one end at which the second passage branches off from the first passage and the other end opposite to the one end, the second passage includes:

at least one end opening at the other end of the second passage; and an inflow reducer configured to restrict the fluid from flowing into the second passage through the at least one end opening, the second passage has two end openings facing each other as the at least one end opening, each of the two end openings has an opening end surface, the opening end surface of each of the two end openings serves as the inflow reducer, and the opening end surface of one of the two end openings and the opening end surface of the other of the two end openings are tilted toward a same side relative to a facing line that connects between two centers of the two end openings.

8. The flowmeter according to claim 7, further comprising a recess, wherein when at least one of the two end openings is projected onto a wall surface of the second passage along a tilting direction of the opening end surface of the at least one of the two end openings, at least a part of the recess is recessed from a projection of the at least one of the two end openings on the wall surface.

9. The flowmeter according to claim 7, further comprising a protrusion, wherein when at least one of the two end openings is projected onto a wall surface of the second passage along a tilting direction of the opening end surface of the at least one of the two end openings, at least a part of the protrusion protrudes into the second passage from a projection of the at least one of the two end openings on the wall surface.

10. The flowmeter according to claim 7, further comprising a recess and a protrusion, wherein when at least one of the two end openings is projected onto a wall surface of the second passage along a tilting direction of the opening end surface of the at least one of the two end openings, at least a part of the recess is recessed from a projection of the at least one of the two end openings on the wall surface, and at least a part of the protrusion protrudes into the second passage from the projection on the wall surface.

11. A flowmeter disposed in a passage through which a fluid flows, the flowmeter comprising:

a first passage defining an opening through which a part of the fluid flows into the flowmeter from the passage; and a second passage branching off from the first passage and including a flow rate detector that is configured to detect a flow rate of the fluid flowing through the second passage from the first passage, wherein
the second passage has one end at which the second passage branches off from the first passage and the other end opposite to the one end,
the second passage includes:
  at least one end opening at the other end of the second passage; and
  an inflow reducer configured to restrict the fluid from flowing into the second passage through the at least one end opening,
the second passage has a single end opening as the at least one end opening,
the inflow reducer is a protrusion protruding into the second passage from a wall surface of the second passage,
the wall surface is a part of the second passage between the flow rate detector and the single end opening,
the protrusion has a peak away from the wall surface of the second passage, and
the peak of the protrusion is offset toward the single end opening.

* * * * *